US008301537B1

(12) United States Patent
Rachev et al.

(10) Patent No.: US 8,301,537 B1
(45) Date of Patent: Oct. 30, 2012

(54) SYSTEM AND METHOD FOR ESTIMATING PORTFOLIO RISK USING AN INFINITELY DIVISIBLE DISTRIBUTION

(75) Inventors: Svetlozar Todorov Rachev, Setauket, NY (US); Gennady Samorodnitsky, Ithaca, NY (US); Youn Shin Kim, Karlsruhe (DE)

(73) Assignee: Finanalytica, Inc., Seattle, WA (US)

( * ) Notice: Subject to any disclaimer, the term of this patent is extended or adjusted under 35 U.S.C. 154(b) by 60 days.

(21) Appl. No.: 13/032,600

(22) Filed: Feb. 22, 2011

Related U.S. Application Data

(60) Provisional application No. 61/306,557, filed on Feb. 22, 2010.

(51) Int. Cl.
G06Q 40/00 (2012.01)
(52) U.S. Cl. .............. 705/36 R; 705/35; 705/37; 705/38
(58) Field of Classification Search ................ 705/36 R, 705/37, 35
See application file for complete search history.

(56) References Cited

U.S. PATENT DOCUMENTS

| | | | | | |
|---|---|---|---|---|---|
| 6,125,355 | A * | 9/2000 | Bekaert et al. | ............... | 705/36 R |
| 6,643,631 | B1 * | 11/2003 | Heyde | ............................. | 706/46 |
| 7,236,953 | B1 * | 6/2007 | Cooper et al. | ............... | 705/36 R |
| 7,349,878 | B1 * | 3/2008 | Makivic | ............................ | 705/37 |
| 7,599,870 | B2 * | 10/2009 | Merkoulovitch et al. | ... | 705/36 R |
| 2004/0172355 | A1 * | 9/2004 | Pandher | ......................... | 705/37 |

OTHER PUBLICATIONS

Adaptive Polar Sampling with an application to a Bayes measure of Value-at-Risk; Luc Bauwens, Charles S. Bos_and Herman K. van Dijk; CORE, Universit_e catholique de Louvain, Econometric and Tinbergen Institutes, Erasmus University Rotterdam and Econometric Institute, Erasmus University Rotterdam, Oct. 21, 1999.*
Estimation of α-Stable Sub-Gaussian Distributions for Asset Returns; Risk Assessment; Contributions to Economics Copyright: 2008; Publisher: Physica-Verlag HD; ISBN: 978-3-7908-2050-8; Subject: Business and Economics; Start p. 111-End p. 152; Url: http://dx.doi.org/10.1007/978-3-7908-2050-8_6; Author: Kring, Sebastian; Rachev, Svetlozar T.*
The Modified Tempered Stable Distribution, GARCH Models and Option Pricing; Young Shin Kim, Svetlozar T. Rachev, Dong Myung Chung and Michele Leonardo Bianchi y; Oct. 9, 2006 (Revised: May 23, 2008).*
Kim, Young, Rachev, Svetlozar, Bianchi, Michele and Fabozzi, Frank J., (2009), Computing VAR and AVaR in Infinitely Divisible Distributions, Yale School of Management Working Papers, Yale School of Management, http://EconPapers.repec.org/RePEc:ysm:somwrk:amz2569.*
J. McCulloch, "Interest-Risk Sensitive Deposit Insurance Premia: Stable Arch Estimates," Journal of Banking and Finance, No. 9, pp. 137-156 (1985).

(Continued)

*Primary Examiner* — Sarah Monfeldt
*Assistant Examiner* — Abhishek Vyas
(74) *Attorney, Agent, or Firm* — Patrick J. S. Inouye

(57) ABSTRACT

A system and method for estimating portfolio risk using an infinitely divisible distribution is provided. A time series comprising a plurality of risk factors applicable over at least one time horizon, a portfolio comprising a plurality of financial assets, and one or more risk adjusted return points for the financial assets are stored. The financial assets are associated with the risk factors. The parameters of one or more risk factors such as financial returns series are estimated based on an infinitely divisible tempered stable distribution model exhibiting leptokurtic behavior. Scenarios are generated for the model. One of Value at Risk, Average Value at Risk, and their derivatives are then determined.

20 Claims, 9 Drawing Sheets

OTHER PUBLICATIONS

Liu et al., "Maximum Likelihood Estimation of a Garch-Stable Model," Journal of Applied Econometrics, vol. 10, No. 3 (Jul.-Sep. 1995), pp. 273-285 (1995).

Y. Miyahara, "The [GLP & MEMM] Pricing Model and its Calibration Problems," Discussion Papers in Economics, Nagoya City University, No. 397 (Oct. 28, 2004).

D. Nelson, "Conditional Heteroskedasticity in Asset Returns: a New Approach," Econometrica, vol. 59, No. 2, pp. 347-370 (Mar. 1991).

J. Rosinski, "Series Representations of Levy Processes from the Respective of Point Processes," In O.E. Barndorff-Nielsen, T. Mikosch, and S.I. Resnick, editors, Levy Processes—Theory and Applications, pp. 401-415, Birkhauser, Boston (2001).

Asmussen et al., "Approximations of Small Jumps of Levy Processes with a View Towards Simulations," Journal of Applied Probability, No. 38(2), pp. 482-493 (2001).

J. Rosinski, "Tempering Stable Processes," Stochastic Processes and Their Applications, No. 117(6), pp. 677-707 (Aug. 12, 2004).

Loretan et al., "Testing the Covariance Stationarity of Heavy-Tailed time series," Journal of Empirical Finance, No. 1, pp. 211-248 (1994).

Black et al., "The Pricing of Options and Corporate Liabilities," The Journal of Political Economy, vol. 81, No. 3, pp. 637-654 (1973).

Robert C. Merton, "The Theory of Rational Option Pricing," The Bell Journal of Economics and Management Sciences, vol. 4, Issue 1, pp. 141-183 (1973).

Harrison et al., "Martingales and Arbitrage in Multiperiod Securities Markets," Journal of Economic Theory, No. 20, pp. 381-408 (1979).

Harrison et al., "Martingales and Stochastic Integrals in the Theory of Continuous Trading," Stochastic Processes and their Applications, vol. 11, No. 3, pp. 215-260 (1981).

Eugene F. Fama, "The Behavior of Stock Market Prices," Journal of Business, vol. 38, No. 1, pp. 34-105 (Jan. 1965).

B. Mandelbrot, "New Methods in Statistical Economics," Journal of Political Economy, No. 71, pp. 421-440 (1963).

Robert F. Engle, "Autoregressive Conditional Heteroscedasticity with Estimates of the Variance of United Kingdom Inflation," Econometrica, vol. 50, No. 40, pp. 987-1007 (Jul. 1982).

Tim Bollerslev, "Generalized Autoregressive Conditional Heteroskedasticity," Journal of Econometrics, No. 31, pp. 307-327 (1986).

Casper G. de Vries, "On the Relation Between GARCH and Stable Processes," Journal of Econometrics, No. 48, pp. 313-324 (1991).

Groenendijk et al., "A Note on the Relationship Between GARCH and Symmetric Stable Processes," Journal of Empirical Finance, No. 2, pp. 253-264 (1995).

Carr et al., "The Fine Structure of Asset Returns: An Empirical Investigation," Journal of Business, vol. 75, No. 2, pp. 305-332 (2002).

R. Engle, "Dynamic Conditional Correlation—A Simple Class of Multivariate GARCH Models," Economics Working Paper Series from Department of Economics, University of California, San Diego (2000).

Longstaff et al., "Valuing American Options by Simulation: A Simple Least-Squares Approach," Review of Financial Studies, No. 14, pp. 113-147 (2001).

Hull et al., "The Pricing of Options on Assets with Stochastic Volatilities," Journal of Finance, vol. 42, Issue 2, pp. 281-300 (Jun. 1987).

B. Mandelbrot, "The Variation of Certain Speculative Prices," Journal of Business, No. 36, pp. 394-419 (1963).

T. Bollerslev, "A Conditional Hereroskedastic Time Series Model for Speculative Prices and Rates of Return," Review of Economics and Statistics, No. 69, Issue 3 (Aug. 1987).

Derman et al., "Riding on a Smile," Risk Publications, vol. 7, No. 2, pp. 277-284 (1994).

B. Dupire, "Pricing with a Smile," Risk, vol. 7, No. 1, pp. 18-20 (1994).

S. Heston, "A Closed Form Solution for Options with Stochastic Volatility with Applications to Bond and Currency Options," Review of Financial Studies, No. 6, No. 2, pp. 327-343 (1993).

M. Signahl, "On Error Rates in Normal Approximations and Simulation Schemes for Levy Processes," Stochastic Models, vol. 19, No. 3, pp. 287-298 (2003).

\* cited by examiner

SYSTEM AND METHOD FOR ESTIMATING PORTFOLIO RISK USING AN INFINITELY DIVISIBLE DISTRIBUTION

CROSS-REFERENCE TO RELATED APPLICATIONS

This non-provisional patent application claims priority under 35 U.S.C. §119(e) to U.S. Provisional Patent application, Ser. No. 61/306,557, filed Feb. 22, 2010, the disclosure of which is incorporated by reference.

FIELD

The present invention relates in general to financial portfolio management and, specifically, to a system and method for estimating portfolio risk using an infinitely divisible distribution.

BACKGROUND

Stock market crashes like those in October 1987 and October 1997, the turbulent period around the Asian Crisis in 1998 through 1999, or the burst of the "dotcom bubble", together with the severely volatile period after Sep. 11, 2001 constantly reminds financial engineers and risk managers how often extreme events actually happen in the real-world of financial markets. These observations have led to increased efforts to improve the flexibility and statistical reliability of existing models to capture the dynamics of economic variables. The history of probabilistic modeling of economic variables, and especially price processes, by means of stochastic processes goes back to Bachelier who suggested Brownian Motion as a candidate to describe the evolution of stock markets. Not until 70 years later that Black, F. and Scholes M. "The pricing of options and corporate liabilities", *The Journal of Political Economy*, 81(3):637-654 (1973), and Merton, R. C., "The theory of rational option pricing", *Bell Journal of Economics and Management Sciences*, 4(1):141-183 (1973), the disclosures of which are incorporated by reference, used Geometric Brownian Motion to describe the stock price movements in their famous solution of the option pricing problem. Their Nobel Prize winning work inspired the foundation of the arbitrage pricing theory based on the martingale approach described in Harrison, J. M. and Kreps, D. M. "Martingales and arbitrage in multi-period securities markets", *Journal of Economic Theory*, 20:381-408 (1973), and subsequently by Harrison, J. M. and Pliska, S. R., "Martingales and stochastic integrals in the theory of continuous trading", *Stochastic Processes and their Applications*, 11(3): 215-260 (1981), the disclosures of which are incorporated by reference.

The key observation, that pricing of derivatives has to be effected under a so called risk-neutral or equivalent martingale measure usually denoted as Q, which differs from the data generating "market measure", usually denoted as P, has led to increasing research on what is called "implicit models". Examples of implicit models include stochastic volatility models, local volatility models, martingale models for the short rate and implied volatility models. The common characteristic inherent to implicit models is that the model parameters are not determined through estimation from observations under the market measure, but through calibration on market prices of derivatives directly under the martingale measure. As a direct consequence, and at the same time, the main drawback of the calibration framework is that the market prices cannot be explained, they are just fitted. The prices of liquid market instruments are used for the calibration procedure and, consequently, are reproduced more or less perfectly. However, for exotic derivatives the prices derived from the implicit models differ substantially, since there is no market data on which to directly calibrate. Moreover, from an objective viewpoint, there is no way to determine which pricing model is the most reliable one given that the statistical fit to historical realization of the underlying is not taken into account.

An alternative approach to model price processes is pursued by econometricians. The goal of this approach is to provide the highest possible accuracy with respect to the empirical observations, or, in other words, to model the statistical characteristics of financial data. Thus, the focus of this approach lies in the statistical properties of historical realization and the quality of forecasts. However, in using these models, important aspects of derivative pricing are neglected. Most econometric approaches neither present any risk neutral price processes nor are the markets defined in these models checked for the absence of arbitrage. Further, the econometric model approach assumes implicit or explicit knowledge of the statistical characteristics of financial data. Researches accept that financial return distributions are left-skewed and leptokurtic. This property of distributions was first studied in Fama, E., "The behavior of stock market prices", *Journal of Business*, 38:34-105 (1965), and Mandelbrot, B. B., "New methods in statistical economics", *Journal of Political Economy*, 71:421-440 (1963), and subsequently reported by various authors including in Rachev, S. T. and Mitnik, S., *Stable Paretian Models in Finance*, John Wiley & Sons (2000), the disclosures of which are incorporated by reference. A probability distribution is considered leptokurtic if the distribution exhibits Kurtosis, where the mass of the distribution is greater in the tails and is less in the center or body, when compared to a Normal distribution.

In addition, a probability distribution can be considered asymmetric if one side of the distribution is not a mirror image of the other side, when the distribution is divided at the maximum value point or the mean. Additionally, in time-series or longitudinal sections of return distributions, one observes volatility clustering, that is, calm periods, which are followed by highly volatile periods or vice versa. Autoregressive conditional heteroskedastic (ARCH) models and the extension to generalized ARCH (GARCH) models introduced in Engle, R., "Autoregressive conditional heteroskedasticity with estimates of the variance of united kingdom inflation", *Econometrica*, 50:987-1007 (1982), and Bollerslev, T., "Generalized autoregressive conditional heteroskedasticity", *Journal of Econometrics*, 31:307-327 (1986), the disclosures of which are incorporated by reference, have become standard tools in empirical finance. They are capable of capturing two important features that characterize time series of returns on financial assets: volatility clustering or conditional heteroskedasticity and excess leptokurtosis or heavy-tailedness. As mentioned above, both of these phenomena were already observed by Mandelbrot, but he focused on the second property and proposed the stable Paretian distribution as a model for the unconditional asset returns.

However, unconditional heavy-tails and GARCH phenomena are not unrelated. For example, Diebold, F. X., "Empirical Modeling of Exchange Rate Dynamics", *Springer* (1998), the disclosure of which is incorporated by reference, demonstrates that the GARCH process driven by normally distributed innovations generate time series with heavy-tailed unconditional distributions, and in de Vries, C. G., "On the relation between GARCH and stable processes", *Journal of*

*Econometrics*, 48:313-324 (1991), and Groenendijk, P. A., Lucas, A., and de Vries, C. G., "A note on the relationship between GARCH and symmetric stable processes", *Journal of Empirical Finance*, 2:253-264 (1995), the disclosures of which are incorporated by reference, show that certain GARCH processes can give rise to unconditional stable Paretian distributions.

When fitting GARCH models to return series, GARCH residuals still tend to be heavy tailed. To accommodate this, GARCH models with heavier conditional innovation distributions than those of the normal have been proposed, among them the Student's t-distribution and the generalized error distribution (GED). To allow for particularly heavy-tailed, conditional, and unconditional, return distributions, GARCH processes with non-normal stable Paretian error distributions have been considered. The class of stable Paretian distributions contains the normal distribution as a special case, but also allows for heavy-tailedness, i.e., infinite variance, and asymmetry. Neither the Student's nor the GED distribution share the latter property. The stable Paretian distribution also has the appealing property that the stable Paretian distributions is the only distribution that arises as a limiting distribution of sums of independently, identically distributed (iid) random variables. This is required when error terms are assumed to be the sum of all external effects that are not captured by the model.

An occasional objection against the use of the non-normal stable Paretian distribution is that the distribution has infinite variance. This seems to contradict empirical studies suggesting the existence of third or fourth moments for various financial return data. For this reason, an enhanced GARCH model with innovations which follow the smoothly truncated stable (STS) distribution have been introduced in Menn, C., Rachev, S. T., "Smoothly truncated stable distributions, GARCH models, and option pricing", *Mathematical Methods of Operations Research* 69:411-438 (2009), the disclosure of which is incorporated by reference. While the STS distribution has finite values for all moments, the distribution has neither exact form of probability density function nor the characteristic function. Kim, Y. S., Rachev, S. T., Bianchi, M. L., Fabozzi, F., "Tempered stable and tempered infinitely divisible GARCH models", *Journal of Banking and Finance* 34, 2096-2109 (2010), the disclosure of which is incorporated by reference, used the classes of tempered stable distributions which have the closed form of characteristic functions, for modeling the innovations. More precisely, as the innovation distribution, they used the CGMY distribution, as described in Carr, P., Geman, H., Madan, D., Yor, M., "The fine structure of asset returns: an empirical investigation", *Journal of Business* 75, 305-332) (2002), the MTS distribution, as described in Kim, Y. S., Rachev, S. T., Chung, D. M., Bianchi, M. L., "The modified tempered stable distribution, GARCH-models and option pricing", *Probability and Mathematical Statistics* 29:91-117) (2009), and the KR distribution, as described in Kim, Y. S., Rachev, S. T., Bianchi, M. L., and Fabozzi, F. J., "A new tempered stable distribution and its application to finance" (2008), as the innovation distribution, the disclosures of which are incorporated by reference. The main drawback of those tempered stable distributions is that the values of their exponential moments are finite only on some closed interval in the real line. In the parameter estimation and the Monte Carlo simulation, the innovation processes are bounded in this closed interval.

SUMMARY

The drawbacks and limitations of the previous approaches to financial market modeling are overcome by the system and method described herein. The system achieves maximum statistical reliability, statistical model accuracy, and predictive power in order to achieve market consistent derivative pricing. The system provides the required behavior in two respects. First, scenarios for future market prices and value at risk are accurately predicted. Second, arbitrage-free prices of derivatives are produced, in the risk neutral world.

The system employs a infinitely divisible distribution which allows the leptokurtic property, asymmetry, and existence of arbitrary moments and the exponential moment for all real line. A synthetic Tempered Stable (SynTS) distribution is one example of the infinitely divisible distribution. The synthetic Tempered Stable distribution is obtained by taking an α-stable law and multiplying the Levy measure by the rapidly decreasing functions onto each half of the real axis. The rapidly decreasing Tempered Stable (RDTS) distribution, exponentially tilted rapidly decreasing Tempered Stable distribution, and generalized rapidly decreasing Tempered Stable distribution are subclasses of the synthetic Tempered Stable distribution. The infinitely divisible distributions can be implemented for univariate or multivariate cases.

The stochastic process models employed herein are based on three main components: (1) A general multivariate time series process, such as the ARMA-GARCH family; (2) an innovation process where the marginal of the probability distribution follow an infinitely divisible distribution; (3) and a dependence structure model which could be based on two approaches: (3.1) a copula approach to model the dependence structure between the risk factors; (3.2) and a subordinated model representation of the infinitely divisible distribution.

The use of a multivariate time series model, such as the ARMA-GARCH family, allows for the explanation of key statistical features of returns including, autocorrelation and heteroskedasticity. Some subclasses of infinitely divisible distributions (e.g. RDTS, or SynTS distribution) offers enough flexibility to describe the leptokurtic or heavy-tailed shape of empirical return distributions, while preserving the essential property of finite second moments of the probability distribution. The use of either a copula approach or subordinate model representation combine modeling flexibility with computational tractability for complex dependency structures. All together the approach leads to a realistic and reliable model to describe the statistical properties of objects in the financial market, for example the return process of stocks or indexes, the term structure of interest rates, and the defaultable firm values.

The first step is a multivariate stochastic process describing the joint dynamics of different risk factors including, returns of individual securities, returns of appropriate market indices, various types of yield curves, exchange rates, interest rates, and default probability. For the second step, the model parameters for the system can be calibrated to a set of exogenously provided derivative prices. In the third step, the system calculates risk measures and determines prices of derivatives including options and swaps. Calculated risk measures can then be used for portfolio optimization.

One embodiment provides a system and method for estimating portfolio risk using an infinitely divisible distribution is provided. A time series comprising a plurality of risk factors applicable over at least one time horizon, a portfolio comprising a plurality of financial assets, and one or more risk adjusted return points for the financial assets are stored. The financial assets are associated with the risk factors. The parameters of one or more risk factors such as financial returns series are estimated based on an infinitely divisible tempered stable distribution model exhibiting leptokurtic behavior. Scenarios are generated for the model. One of Value at Risk, Average Value at Risk, and their derivatives are then determined.

Still other embodiments of the present invention will become readily apparent to those skilled in the art from the following detailed description, wherein are described embodiments by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

System Overview

Figure 1:
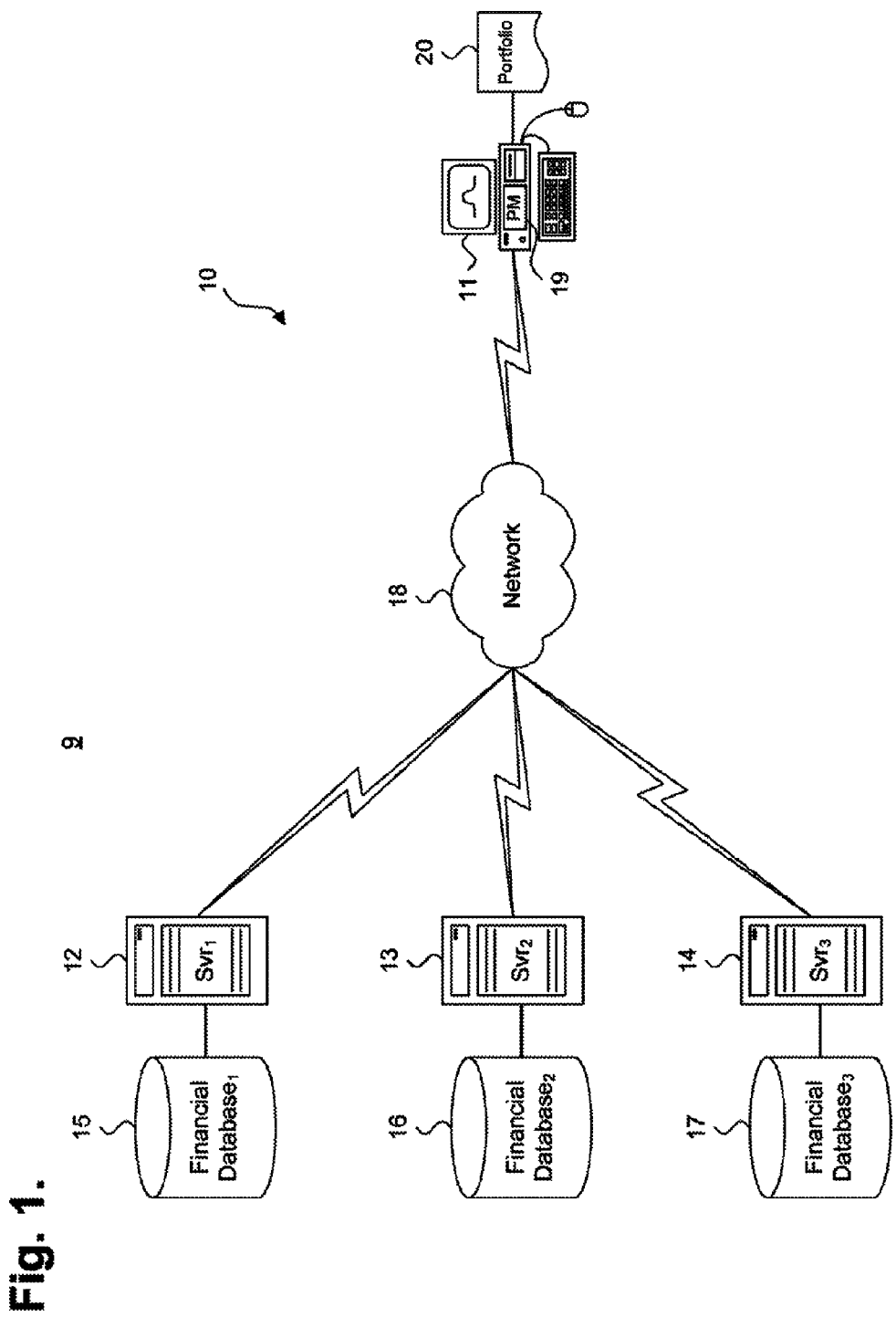
FIG. 1 is a functional block diagram showing a system for estimating portfolio risk using an infinitely divisible distribution, in accordance with one embodiment.

FIG. 1 is a functional block diagram 9 showing a system 10 for estimating portfolio risk using an infinitely divisible distribution, in accordance with one embodiment. A workstation 11 is interoperatively interfaced to a plurality of servers 12-14 over a network 18, which can include an internetwork, such as the Internet, intranetwork, or combination of networking segments. In a further embodiment, the workstation 11 operates as a stand-alone determiner system without interfacing directly to other determiner systems, although data can still be exchanged indirectly through file transfer over removable media. Other network domain topologies, organizations and arrangements are possible.

The workstation 11 includes a portfolio modeler (PM) 19 that generates the vectors and estimates portfolio risk for a portfolio of financial assets 20, as further described below beginning with reference to FIG. 2. The servers 12-14 each maintain a database 15-17 containing financial data, such as historical record of securities and risk factors for securities, that can optionally be retrieved by the workstation 11 during parameter estimation, scenario generation, risk calculation, risk budgeting, portfolio optimization, and portfolio reoptimization. The portfolio 20 can include one or more financial assets, including securities and other forms of valuated properties, such as described in Fabozzi, F. J., "The Theory & Practice of Investment Management," Chs. 1-2, pp. 3-42, Wiley & Sons, Inc., New York (2002), the disclosure of which is incorporated by reference. In one embodiment, a portfolio 20 with a flat structure is optimized, where all assets, regardless of type, are in the same portfolio. In a further embodiment, each portfolio 20 can be composed of any number of subportfolios, which can also be composed of subportfolios to any depth of hierarchy. A subportfolio can be used, for instance, to contain any set of financial assets 26 convenient to the user or portfolio manager. In some cases, a user or portfolio manager may decide to create subportfolios, which segregate the overall portfolio by asset type or class. With a hierarchical portfolio, the optimization can be done within each subportfolio and across the collections of portfolios at any level in the hierarchy. Moreover, the time horizon of the optimization can be different for each level of portfolio and subportfolio.

The individual determiner systems, including the workstation 11 and servers 12-14, are general purpose, programmed digital determining devices consisting of a central processing unit (CPU), random access memory (RAM), non-volatile secondary storage, such as a hard drive or CD ROM drive, network interfaces, and can include peripheral devices, such as user interfacing means, such as a keyboard and display. Program code, including software programs, and data are loaded into the RAM for execution and processing by the CPU and results are generated for display, output, transmittal, or storage.

Figure 2:
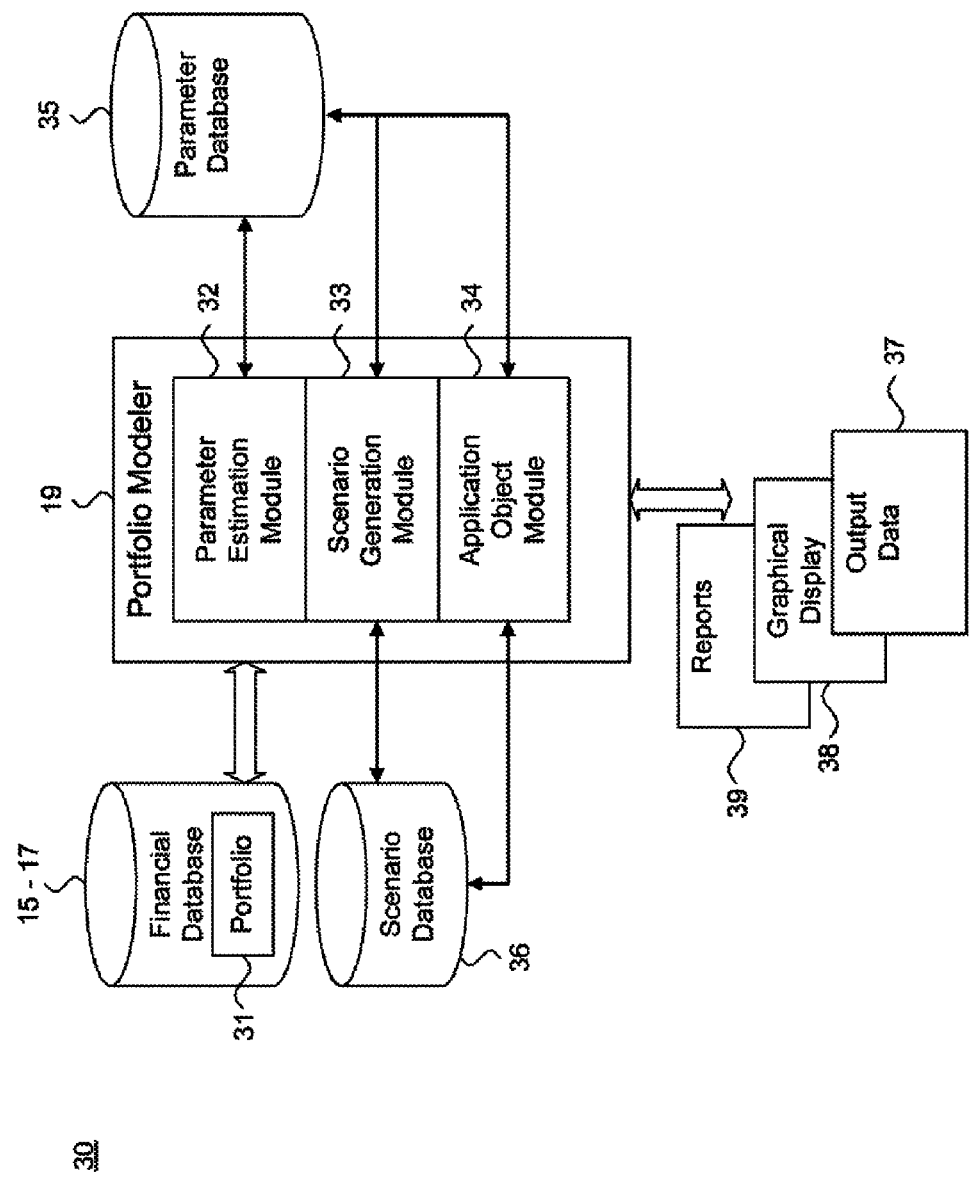
FIG. 2 is a block diagram showing a portfolio modeler for use in the system of FIG. 1.

FIG. 2 is a block diagram 30 showing a portfolio modeler 19 for use in the system 10 of FIG. 1. The portfolio modeler 19 estimates financial risk and valuation of derivatives by utilizing a class of infinitely divisible distributions and time series models based on the infinitely divisible distribution and optimizes risk adjusted return for the portfolio 31 of financial assets. The portfolio modeler 19 includes components, or modules, for estimating parameters 32 and generating scenarios 33, and one or more application object modules 34 to calculate portfolio risk, portfolio optimization, and option pricing. The portfolio optimizer 19 maintains one or more databases in which historical and generated financial data and variables, such as observation data and associated dates, time windows for selecting financial data sample size is stored. Other stored data is possible, including risk factors, risk free rates, benchmark returns, asset allocation weights, and risk adjusted returns. As outputs for use by a user or portfolio manager, the portfolio modeler 19 can generate output data such as risk factor scenarios, option pricing, and portfolio optimization results, graphical displays 38, such as an efficient frontier graph, and reports 39, such as a risk report or tabular report of an optimized portfolio or scenarios. Other forms of output are possible.

The parameter estimation module 32 reads returns of individual securities, returns of appropriate market indices, various types of yield curves, exchange rates, interest rates, default probability, and derivatives prices including options and futures. The parameter estimation module 32 then estimates market parameters and risk-neutral parameters for infinitely divisible models with time varying volatility, as further described below with reference to FIG. 3. An example of the infinitely divisible model with time varying volatility is the ARMAX-GARCH model with univariate and multivariate infinitely divisible distributed innovations. Estimated parameters are saved in the parameter database 35, on a regular basis, such as everyday.

The scenario generation module 33 generates scenarios using the estimated parameters, as further described below with reference to FIG. 4. The scenario generation module 33 forecasts future probability distribution of asset returns based on the infinitely divisible model with time varying volatility using parameters estimated and saved by parameter estimation module 32. The scenario generation module 33 generates simulated future scenario of market volatility process, market return process, risk-neutral volatility process, and risk-neutral return process. Generated processes are saved in a scenario database 36.

The application object modules 34 utilize various applications using the estimated parameters and generated scenarios, as further described below with reference to FIG. 5. The major application objects are value at risk (VaR) and average value at risk (AVaR) calculators and European/American type option price calculator. Portfolio optimization can be then be carried out using the VaR and AVaR calculator.

Parameter Estimation Module

Figure 3:
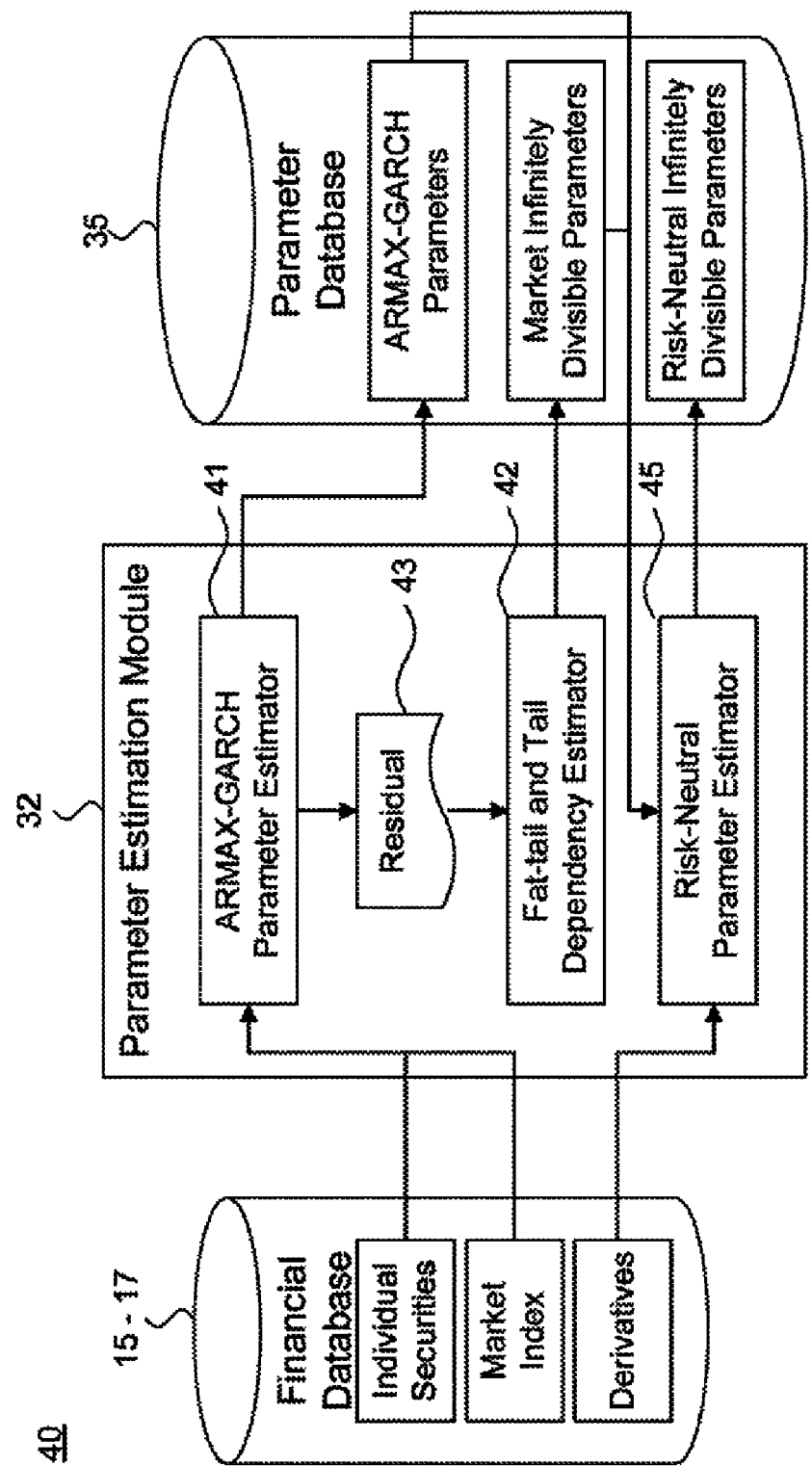
FIG. 3 is a block diagram showing a parameter estimation module for use in the portfolio modeler of FIG. 2.

FIG. 3 is a block diagram 40 showing a parameter estimation module 32 for use in the portfolio modeler 19 of FIG. 2. The parameter estimation module 32 reads returns of individual securities, market indexes (i.e. returns of appropriate market indices, various types of yield curves, exchange rates, interest rates, and default probability), and derivatives prices including options and futures from a financial database 15-17 and then estimates ARMAX-GARCH model parameters and infinitely divisible model parameters. Estimated parameters are the stored in the parameter database 35.

Estimation consists of two portions. One is market parameter (or physical parameter) estimation and the other is risk-neutral parameter estimation. The market parameter estimation includes a ARMAX-GARCH parameter estimator 41 and a Fat-tail and tail dependency estimator. The ARMAX-GARCH parameter estimator 41 estimates ARMAX-GARCH model parameters using returns of individual securities and market indexes, and then generate a residual time-series 43. The Fat-tail and tail dependency estimator 42 estimates parameters of infinitely divisible distributions and dependence structure using the residual 43 and parameters estimated by the ARMAX-GARCH parameter estimator 41. In one embodiment the ARMAX-GARCH is omitted. In others the ARMAX-GARCH parameter estimator 41 can include only the ARMA or the GARCH component of the ARMAX-GARCH model. Parameters of infinitely divisible distributions are modeled by various tempered stable and tempered infinitely divisible distributions, as further described below in the section titled Infinitely Divisible Distribution. The dependence structure can be modeled in two ways, by a copula method and or by a sub-Gaussian (GRDTS) model as further described below in the section titled Multi-dimensional Consideration.

The risk-neutral parameter estimation portion, as carried out by a neutral parameter estimator 45, estimates risk-neutral parameters of an infinitely divisible model using derivatives prices and market parameters estimated in the market parameter estimation portion. The risk neutral parameters deduce an equivalent martingale measure (EMM), which is a martingale measure equivalent to the market measure generated by the market infinitely divisible parameters. If market data of derivative prices for given underlying stock is given, risk neutral parameters can be estimated using the derivative prices. In one embodiment, first, fix ARMAX-GARCH parameters estimated using market stock prices. In other embodiments the ARMAX-GARCH component is skipped. Next, calibrate risk neutral parameters. In order to estimate risk neutral parameters, two methods can be used. The first is using market price of derivatives (for example european options) and the second is using mathematical theory for finding EMM. In the first method, the risk neutral parameters are calibrated by minimizing distance between theoretical derivative prices and market prices. The square root error can be used as the distance. The theoretical price can be calculated by the Monte-Carlo simulation method. If there is no data for the derivatives, then the second method is used. Risk neutral parameters satisfying conditions of Theorem 1, Proposition 1, or Corollary 1 to be used, as described further in detail below.

The method of the market parameter estimation portion and the method of the risk-neutral parameter estimation portion are further described below with reference to FIG. 5 and FIG. 6, respectively. The ARMAX-GARCH model and infinitely divisible models considered in this module are explained in further described below in the section titled ARMAX-GARCH process and the section Infinitely Divisible Distribution, respectively.

Scenario Generation Module

Figure 4:
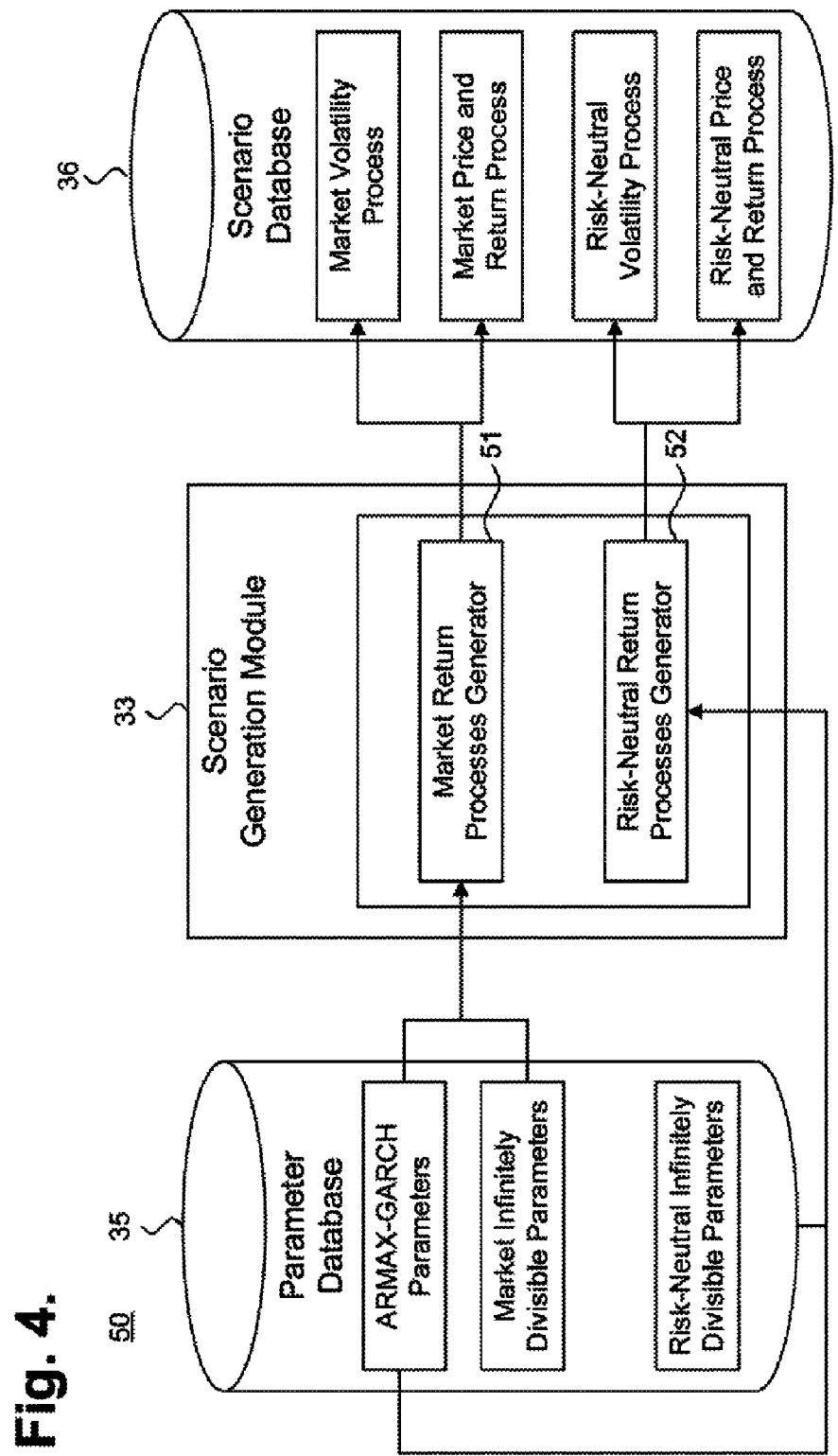
FIG. 4 is a block diagram showing a scenario generation module for use in the portfolio modeler of FIG. 2.

FIG. 4 is a block diagram 50 showing a scenario generation module 33 for use in the portfolio modeler 19 of FIG. 2. The scenario generation module 33 reads ARMAX-GARCH model parameters, infinitely divisible model parameters, and risk-neutral parameters estimated by the parameter estimation module 32 from the parameter database 35. The scenario generation module 33 then forecasts future volatility and simulating future return processes. The scenario generation module 33 generates market scenarios and risk-neutral scenarios. Market scenarios are generated by a market return processes generator 51 and risk-neutral scenarios are generated by a risk-neutral return processes generator 52.

In both scenario generations, infinitely divisible random number generation is an important issue. Infinitely divisible random number can be generated by an inverse transform algorithm or series representation method. The inverse transform algorithm uses inverse function of cumulative distribution function to generate the random numbers. Inverse function of the cumulative distribution function for given infinitely divisible distribution is taken. Next, uniformly distributed random numbers are put into the inverse function and then the random number for a given infinitely divisible distribution is obtained. The cumulative distribution function for infinitely divisible distribution is described further below in relation to Proposition 2. Series representation for the RDTS distribution can be simulated by Theorem 2.

The method of the market return processes generator 51 and the method of the risk-neutral return processes generator 52 are further described below with reference to FIG. 7 and FIG. 8, respectively. The ARMAX-GARCH model and infinitely divisible models considered in this module are explained in further described below in the section titled ARMAX-GARCH process and the section Infinitely Divisible Distribution, respectively.

Application Object Module

Figure 5:
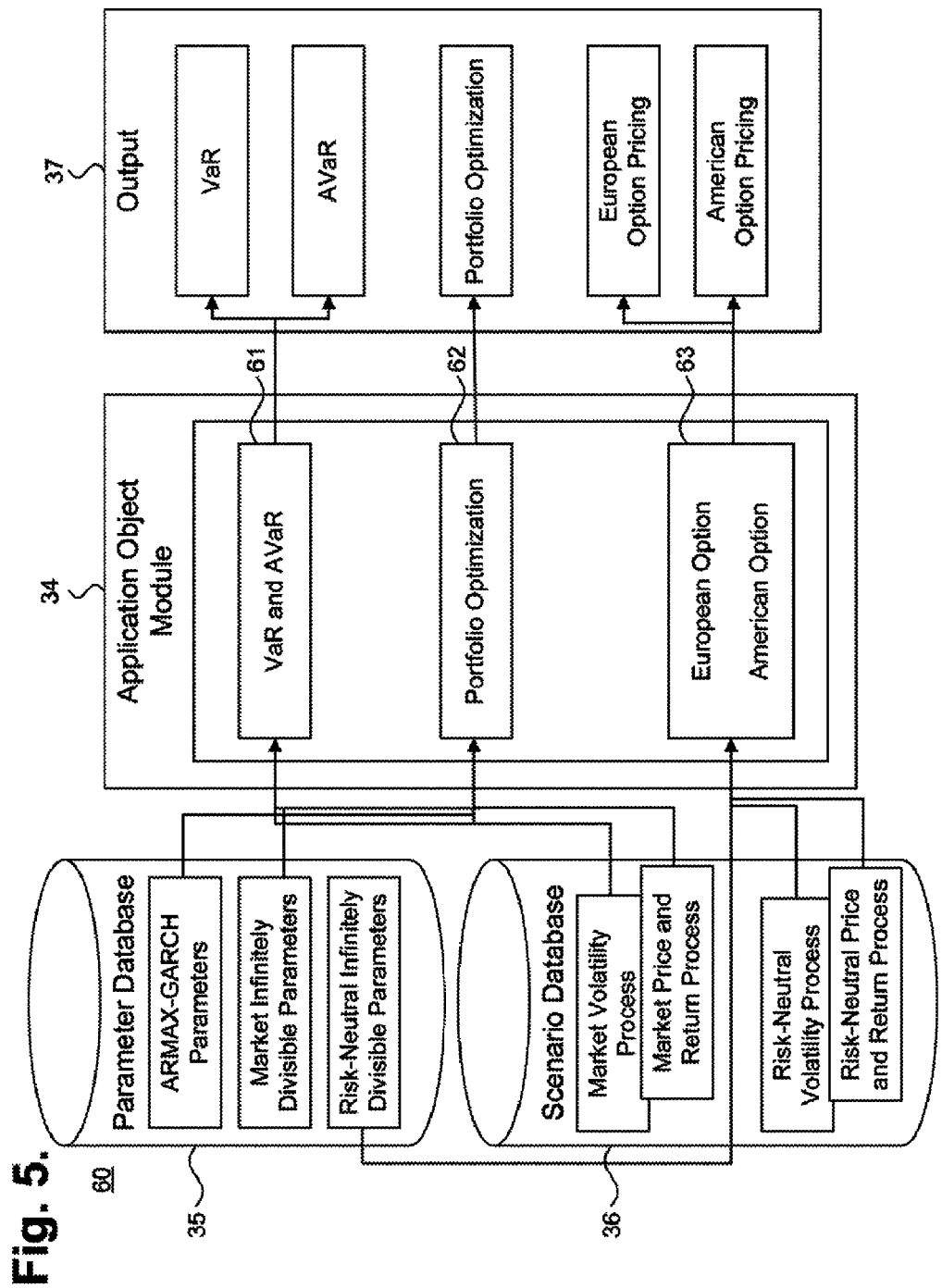
FIG. 5 is a block diagram showing an application object module for use in the portfolio modeler of FIG. 2.

FIG. 5 is a block diagram 60 showing an application object module 34 for use in the portfolio modeler 19 of FIG. 2. VaR and AVaR object 61 is used to calculate VaR and AVaR from the market ARMAX-GARCH parameters and market infinitely divisible parameters in the parameter database 35. More detail regarding calculating VaR and AVaR with the parametric method is described further below in the section titled Implementation: Calculating VaR and AVaR. In a further embodiment, the simulated scenarios stored in the scenarion database 36 can be used to calculate portfolio VaR and AVaR.

Portfolio Optimization object 62 is implemented using parameters and scenarios from the parameter database 35 and the scenarion database 36. In this application object, VaR and AVaR object 61 are partially used to measure portfolio risk and minimize the risk.

European option and American option 63 object is used to calculate prices of European and American options, respectively. The objects use risk neutral parameters from the parameter database 35 and simulated risk-neutral scenario from the scenarion database 36. More details for option pricing are described further below in the section Implementation: Pricing Derivatives. An example of European option pricing under ARMAX-GARCH model with infinitely divisible innovations is provided in the section Example: Pricing call options under the GARCH model with RDTS distributed innovations.

Preliminary

A derivative, also known as a contingent claim, is a financial contract whose values depends on the value of other, more basic underlying variables, called "underlyings". The underlyings can be individual securities, securities indexes or virtually any other variable including interest rates, credit defaults, foreign exchange rates, commodity prices, weather, crop yields, or virtually any other price or a function of these quantities. Futures, swaps and options are examples of derivatives. For example, a stock option is a derivative whose value is contingent on the (underlying) price of the stock. At the same time, the stock itself can be viewed as a contingent claim on the value of the firm issuing the stock. A "call" option gives the holder the right but not the obligation to buy, and a "put" option gives the holder the right but not the obligation to sell. The date in the contract is the "expiration date" or "maturity". If the option allows exercise before the maturity date, then it is "American" style option, but if the option allows exercise only at the maturity, then it is "European" style option. The rising cash flow, when the option holders exercise their right is the "payoff". For example, when a payoff is given by the difference between the current stock price and some fixed price, the fixed price in the contract is the "exercise" or "strike" price. A "real option" is a derivative whose "underlyings" are real world asset as opposed to financial assets. Real assets include land, plant, machinery, and so forth. Options can be embedded in investment projects; some examples are an abandonment option, an expansion option, a contraction option, an option to defer, and an option to extend. Other options are also possible.

The system uses time series processes with Infinitely Divisible innovations for the calculation of probability distributions of financial returns of risk factors. The risk factors can be the market price returns of individual financial assets or securities themselves or of a portfolio of financial assets. In other cases, risk factors can be derived as computed values, perhaps from fundamental securities information, or they can be an exogenous factor, such as interest rates or macroeconomic factors, which may affect the price of a security.

In the discussion herein, few, if any, restrictions are placed on the nature of the risk factors used by various embodiments. In the following discussion, the term return can refer to the relative change in any risk factor over some time horizon or time period.

Infinitely Divisible Distribution

In this section some classical distribution theory for infinitely divisible distributions and their relation with Levy processes is discussed. A random variable Y is called infinitely divisible if, for each $n \in N$, there are iid random variables $$Y_{n,1}, Y_{n,2}, \ldots, Y_{n,n} \text{ such that } Y \stackrel{d}{=} \sum_{k=1}^{n} Y_{n,k},$$

where "$\stackrel{d}{=}$" denotes equality in distribution.

A Borel measure v on R is called a Levy measure if v(0)=0 and $\int (1 \wedge |x^2|)v(dx) < \infty$. If Y is infinitely divisible, then the characteristic function $\phi_Y(u) = E[e^{iu Y}]$ is given by the -Khintchine formula:

$$\phi_Y(u) = \exp\left(i\gamma u - \frac{1}{2}A^2 u + \int_{-\infty}^{\infty}(e^{iux} - 1 - iux1_{|x|\leq 1})v(dx)\right), \quad (1)$$

where $A \geq 0$, $\gamma \in$ and v is a measure. This triplet $(A^2, v, \gamma)$ is unique and called a Levy triplet of Y. Conversely, for any choice $(A^2, v, \gamma)$ satisfying the conditions above, there exists an infinitely divisible random variable Y whose characteristic function is given as $\phi_Y$.

A stochastic process $X=(X_t)_{t \geq 0}$ on $(\Omega, F, P)$ is called a Levy process if the following five conditions are satisfied:
1. $X_0=0$ a.s.
2. X has independent increments: given $0 < t_1 < t_2 < \ldots < t_n$, the random variables $X_{t_1}$, $X_{t_2} - X_{t_1}$, ..., $X_{t_n} - X_{t_{n-1}}$ are independent.
3. X has stationary increment: for $t \geq 0$, the distribution of of $X_{t+s} - X_s$ does not depend on $s \geq 0$.
4. X is stochastically continuous: $\forall t \geq 0$ and $\alpha > 0$, $$\lim_{s \to t} P[|X_s - X_t| > a] = 0.$$

5. X is right continuous and has left limits.

If $X=(X_t)_{t \geq 0}$ is a process, then for any $t \geq 0$, $X_t$ is an infinitely divisible random variable and its triplet is $(tA^2, tv, t\gamma)$. Conversely, if Y is an infinitely divisible random variable, then there exists uniquely a process $(X_t)_{t \geq 0}$ such that $X_1 = Y$.

The following theorem is necessary to find the equivalent martingale measure Q with respect to given market measure P.

Theorem 1 (Sato, K, *Levy Processes and Infinitely Divisible Distributions,* Cambridge University Press (1999), the disclosure of which is incorporated by reference). Let $(X_t, P)$ and $(X_t, Q)$ be processes on R with triplets $(A^2, v, \gamma)$ and $(\tilde{A}^2, \tilde{v}, \tilde{\gamma})$, respectively. Then $P|_{F_t}$ and $Q|_{F_t}$ are equivalent for all $t > 0$ if and only if the triplets satisfy $$A^2 = \tilde{A}^2, \quad (2)$$

$$\int_{-\infty}^{\infty}(e^{\psi(x)/2} - 1)^2 v(dx) < \infty \quad (3)$$

with the function $$\psi(x) = \ln\left(\frac{\tilde{v}(dx)}{v(dx)}\right)$$

and if $A^2 = 0$ then $$\gamma - \tilde{\gamma} = \int_{|x| \leq 1} x(\tilde{v} - v)(dx).$$

When P and Q are equivalent, the Radon-Nikodym derivative is $$\frac{dQ}{dP}\Big|_{F_t} = e^{U_t} \tag{5}$$

where $(U_t)$ is a process in which triplet $(A_U^2, v_U, \gamma_U)$ of $(U_t)_{t \in [0,T]}$ is given by $$A_U^2 = A^2 \eta^2, \; v_U = o\psi^{-1}, \; \gamma_U = -\frac{A^2 \eta^2}{2} - \int_{-\infty}^{\infty} (e^y - 1 - y 1_{|y| \leq 1}) v_U(dy). \tag{6}$$

Here $\eta$ is such that $$\tilde{\gamma} - \gamma - \int_{|x| \leq 1} x(\tilde{v} - v)(dx) = A^2 \eta$$

if $A > 0$ and zero if $A = 0$.

Let $\alpha \in (0,2)$ and $d \in N$. The Lévy measure $v_0$ of a $\alpha$-stable distribution on $R^d$ can be written in polar coordinates in the form $$v_0(dx) = M_0(dr, du) = r^{-\alpha-1} dr \, \zeta(du), \tag{7}$$

where $\alpha \in (0,2)$, $\zeta$ a finite measure on the unit sphere $S^{d-1}$, and $r > 0$, $u \in S^{d-1}$.

Some embodiments will use infinitely divisible distributions whose measure $v(dx)$ is defined in polar coordinate as follows:

$$v(dx) = M(dr, du) = r^{-\alpha-1} q(r,u) dr \, \zeta(du), \tag{8}$$

where $q(r,u)$ is a positive function on $(0, \infty) \times S^{d-1}$ such that $\lim_{r \to 0^+} q(r,u) > 0$ and $\lim_{r \to \infty} q(r,u) = 0$.

An embodiment will use one of the following distribution for modeling the financial market.

1. If consider $$q(r,1) = e^{-\lambda_+^2 r^2/2}, \; q(r,-1) = e^{-\lambda_-^2 r^2/2},$$

and $$\zeta(1) = C_+, \; \zeta(-1) = C_-$$

where $C_+, C_-, \lambda_+, \lambda_- > 0$, then we obtain the rapidly decreasing tempered stable (RDTS) distribution.

2. If consider $$q(r,1) = e^{\beta r - \lambda^2 r^2/2}, \; q(r,-1) = e^{-\beta r - \lambda^2 r^2/2},$$

and $$\zeta(1) = \zeta(-1) = C$$

where $C, \lambda, \beta > 0$, then we obtain the the exponentially tilted RDTS (ERDTS) distribution.

3. If consider $$q(r,1) = \exp(\beta r - (\lambda_+ r)^p), \; q(r,-1) = \exp(-\beta r - (\lambda_- r)^p), \text{ and}$$

$$\zeta(1) = C_+, \; \zeta(-1) = C_-$$

where $C_+, C_-, \lambda_+, \lambda_- > 0$, $\beta \geq 0$ and $p \geq 1$, then we obtain the generalized RDTS (GRDTS) distribution.

4. If consider $$q(r,1) = \exp\left(-\sum_{n=1}^{N} (\lambda_+(n) \cdot r)^{p(n)}\right) q(r,-1) = \exp\left(-\sum_{n=1}^{N} (\lambda_-(n) \cdot r)^{q(n)}\right),$$

and $$\zeta(1) = C_+, \; \zeta(-1) = C_-$$

where $C_+, C_- > 0$ and $\lambda_+(n), \lambda_-(n), p(n)$, and $q(n)$ are functions from natural numbers to positive real numbers, then we obtain the synthetic tempered stable (SynTS) distribution. The class of SynTS distributions contains RDTS, ERDTS, GRDTS distributions as sunclasses.

5. If consider, for $\lambda_+, \lambda_-, C_+, C_- > 0$ $$q(r,u) = e^{-\lambda_+ r} 1_{u=1} + e^{-\lambda_- r} 1_{u=-1} \text{ and } \zeta(\{1\}) = C_+, \zeta(\{-1\}) = C_-$$

on R, then we obtain the KoBoL or the classical tempered stable (CTS) distribution. If $\lambda_+ = \lambda_-$ then we obtain the flight and if $C_+ = C_-$ then we obtain the CGMY distribution. Moreover, if the CTS distribution has zero mean and unit variance, the distribution is called standard CTS distribution. (See Boyarchenko, S. I. and Levendorskii, S. Z., "Option pricing for truncated Levy processes", *International Journal of Theoretical and Applied Finance*, 3, (2000); Carr, P., Geman, H., Madan, D., Yor, M., "The fine structure of asset returns: an empirical investigation", *Journal of Business* 75, 305-332, (2002); and Koponen, I, "Analytic approach to the problem of convergence of truncated Levy flights towards the Gaussian stochastic process", *Physical Review* E, 52. (1995)) the disclosures of which are incorporated by reference.

This embodiment would use the ARMAX-GARCH process described below in section ARMAX-GARCH processes and then the residuals will be modeled with Classical Tempred Stable.

Multi-dimensional Consideration

Since some embodiment must consider multivariate models with dependency. The dependence structure of a multivariate model is introduced by a copula function C which describes the joint distribution of the infinitely divisible random vector $X_t = (X_t^{(1)}, X_t^{(2)}, \ldots, X_t^{(N)})$. The defining equation is:

$$P(X_t^{(1)} \leq x_1, X_t^{(2)} \leq x_2, \ldots, X_t^{(N)} \leq x_N) = C(F_1(x_1), F_2(x_2), \ldots, F_N(x_N)) \tag{11}$$

where C denotes the copula function and $F_i$, $i = 1, 2, \ldots, N$ denotes the distribution function of the i-th component of the N-dimensional process.

The GRDTS subordinator with parameter $(\alpha, C, \theta, p)$ is a purely non-Gaussian infinitely divisible random variable T whose characteristic function is given by $$\phi_T(u) = \exp\left(\int_0^{\infty} (e^{iux} - 1) \frac{C e^{\theta x^{-p}}}{x^{1+\alpha/2}} dx\right)$$

The N-dimensional Sub-Gaussian GRDTS Model (Type 1):

$$X = (X_1, X_2, \ldots, X_N) = \mu + \gamma(T-1) + \sqrt{T} Z,$$

where
$\mu = (\mu_1, \mu_2, \ldots, \mu_N) \in R^N$, $\gamma = (\gamma_1, \gamma_2, \ldots, \gamma_N) \in R^N$,
$Z = (Z_1, Z_2, \ldots, Z_N) \sim N(0, \Sigma)$, $\Sigma = [\sigma_{k,l}]_{k,l \in \{1,2,\ldots,N\}}$
T: 1-dim GRDTS subordinator with parameter $(\alpha, C, \theta, p)$ The N-dimensional Sub-Gaussian GRDTS Model (Type 2):

$$X = (X_1, X_2, \ldots, X_N) = \mu + \gamma \cdot (T-1) + \sqrt{T} \cdot Z,$$

where
$1 = (1, 1, \ldots 1) \in R^N$,
$\mu = (\mu_1, \mu_2, \ldots, \mu_N) \in R^N$,
$\gamma = (\gamma_1, \gamma_2, \ldots, \gamma_N) \in R^N$,
$Z = (Z_1, Z_2, \ldots, Z_N) \sim N(0, \Sigma)$, $\Sigma = [\sigma_{k,l}]_{k,l \in \{1,2,\ldots,N\}}$
$T = (T_1, T_2, \ldots, T_N)$,
$T_k$: TID subordinator with parameter $(\alpha_k, C_k, \theta_k, p_k)$, $k \in \{1, 2, \ldots, N\}$ $T_k$ and $T_l$ are independent for all $k,l \in \{1,2,\ldots,N\}$.

The N-dimensional Sub-Gaussian GRDTS Model (Type 3):

where $$X=(X_1, X_2, \ldots, X_N)=\mu+\gamma\cdot(T^*-1)+\sqrt{T}\cdot Z,$$

$1=(1,1,\ldots 1) \in R^N,$ $\mu=(\mu_1, \mu_2, \ldots, \mu_N) \in R^N,$ $\gamma=(\gamma_1, \gamma_2, \ldots, \gamma_N) \in R^N,$ $Z=(Z_1, Z_2, \ldots, Z_N) \sim N(0,\Sigma), \Sigma=[\sigma_{k,l}]_{k,l \in \{1,2,\ldots,N\}}$ $T^*=(T^*_1, T^*_N, \ldots, T^*_N),$ $T=(T_1, T_2, \ldots, T_N),$ $T^*_k$: GRDTS subordinator with parameter $(\alpha^*_k, C^*_k, \theta^*_k, p^*_k)$, $k \in \{1,2,\ldots,N\}$ $T_k$: GRDTS subordinator with parameter $(\alpha_k, C_k, \theta_k, p_k)$, $k \in \{1,2,\ldots,N\}$ Rapidly Decreasing Tempered Stable Distributions Let $m \in R$, $C_+$, $C_-$, $\lambda_+$, $\lambda_- > 0$, $\alpha \in (0,2)$, and $\alpha \neq 1$. An infinitely divisible distribution is called the rapidly decreasing tempered stable (RDTS) distribution with parameter $(\alpha, C_+, C_-, \lambda_+, \lambda_-, m)$ if its triplet $(A^2, v, \gamma)$ is given by $A=0,$ $$v(dx) = \left(C_+ e^{-\lambda_+^2 x^2/2} 1_{x>0} + C_- e^{-\lambda_-^2 |x|^2/2} 1_{x<0}\right)\frac{dx}{|x|^{\alpha+1}},$$

and $$\gamma \begin{cases} m - \int_{|x| \leq 1} xv(dx), & \alpha \in (0,1) \\ m - \int_{|x|>1} xv(dx) + \frac{1}{2}\Gamma\left(\frac{1-\alpha}{2}\right)\left(C_+\left(\frac{\lambda_+^2}{2}\right)^{\frac{\alpha-1}{2}} - C_-\left(\frac{\lambda_-^2}{2}\right)^{\frac{\alpha-1}{2}}\right), & \alpha \in (1,2) \end{cases}$$

If a random variable X follows the RDTS distribution then we denote $X \sim \text{RDTS}(\alpha, C_+, C_-, \lambda_+, \lambda_-, m)$.

Let $X \sim \text{RDTS}(\alpha, C_+, C_-, \lambda_+, \lambda_-, m)$. Then the characteristic function of X becomes $$\phi(u)=\exp(ium+C_+ G(iu;\alpha,\lambda_+)+C_- G(-iu;\alpha,\lambda_-)) \quad (12)$$

where $$G(x;\alpha,\lambda) = 2^{-\frac{\alpha}{2}-1}\lambda^\alpha \Gamma\left(-\frac{\alpha}{2}\right)\left(M\left(-\frac{\alpha}{2}, \frac{1}{2}; \frac{x^2}{2\lambda^2}\right)-1\right)+$$

$$2^{-\frac{\alpha}{2}-\frac{1}{2}}\lambda^{\alpha-1} x\Gamma\left(\frac{1-\alpha}{2}\right)M\left(\frac{1-\alpha}{2}, \frac{3}{2}; \frac{x^2}{2\lambda^2}\right),$$

and M is the Kummer's function or the confluent hypergeometric function as described in Andrews, L. D., "Special Functions Of Mathematics For Engineers", *Oxford University Press*, 2nd edition (1998), the disclosure of which is incorporated by reference. The Laplace transform is defined for all real numbers (i.e. $E[e^{\theta X}]<\infty$ for all $\theta \in R$) and have the explicit formula as $$E[e^{\theta X}]=\exp(\theta m+C_+ G(\theta;\alpha,\lambda_+)+C_- G(-\theta;\alpha,\lambda_-)). \quad (13)$$

The cumulants $$c_n(X) = \frac{1}{i^n}\frac{d^n}{du^n}\ln\phi(u)\bigg|_{u=0}$$

of X are given by $$c_n(X) = m 1_{n=1} + \frac{1}{2}\Gamma\left(\frac{n-\alpha}{2}\right)\left(C_+\left(\frac{\lambda_+}{\sqrt{2}}\right)^{\alpha-n} + (-1)^n C_-\left(\frac{\lambda_-}{\sqrt{2}}\right)^{\alpha-n}\right) \quad (14)$$

Moreover, the mean, variance, skewness, and excess kurtosis are obtained using the cumulants:

$$E[X] = c_1(X) = m + 2^{\frac{\alpha+1}{2}}\Gamma\left(\frac{1-\alpha}{2}\right)(C_+\lambda_+^{\alpha-1} - C_-\lambda_-^{\alpha-1}),$$

$$(X) = c_2(X) = 2^{\frac{\alpha}{2}}\Gamma\left(1-\frac{\alpha}{2}\right)(C_+\lambda_+^{\alpha-2} + C_-\lambda_-^{\alpha-2}),$$

$$s(X) = \frac{c_3(X)}{c_2(X)^{\frac{3}{2}}} = 2^{\frac{\alpha}{4}+\frac{1}{2}}\frac{\Gamma\left(\frac{3-\alpha}{2}\right)(C_+\lambda_+^{\alpha-3} - C_-\lambda_-^{\alpha-3})}{\left(\Gamma\left(1-\frac{\alpha}{2}\right)(C_+\lambda_+^{\alpha-2} + C_-\lambda_-^{\alpha-2})\right)^{\frac{3}{2}}},$$

$$k(X) = \frac{c_4(X)}{c_2(X)^2} = 2^{\frac{\alpha}{2}+1}\frac{\Gamma\left(\frac{4-\alpha}{2}\right)(C_+\lambda_+^{\alpha-4} + C_-\lambda_-^{\alpha-4})}{\left(\Gamma\left(1-\frac{\alpha}{2}\right)(C_+\lambda_+^{\alpha-2} + C_-\lambda_-^{\alpha-2})\right)^2}.$$

The parameters $\lambda_+$ and $\lambda_-$ control the rate of decay on the positive and negative part, respectively. If $\lambda_+ > \lambda_-$ ($\lambda_+ < \lambda_-$), then the distribution is skewed to the left (right). Moreover, if $\lambda_+ = \lambda_-$, then it is symmetric.

If $$C = C_+ = C_- = 2^{\frac{\alpha}{2}}\left(\Gamma\left(1-\frac{\alpha}{2}\right)(\lambda_+^{\alpha-2} + \lambda_-^{\alpha-2})\right)^{-1}$$

$$m_0 = -\frac{\Gamma\left(\frac{1-\alpha}{2}\right)(\lambda_+^{\alpha-1} - \lambda_-^{\alpha-1})}{\sqrt{2}\Gamma\left(1-\frac{\alpha}{2}\right)(\lambda_+^{\alpha-2} + \lambda_-^{\alpha-2})},$$

then $X \sim \text{RDTS}(\alpha,C,C,\lambda_+,\lambda_-,m_0)$ has zero mean and unit variance, and X will be called the standard RDTS distribution and denoted by $X \sim \text{stdRDTS}(\alpha, \lambda_+, \lambda_-)$. Moreover, the log-Laplace transform of X will be denoted by $L_{RDTS}(x; \alpha, \lambda_+, \lambda_-)$. By equation (13), the function $L_{RDTS}(x; \alpha, \lambda_+, \lambda_-)$ is finite for all $x \in R$, and then $$L_{RDTS}(x;\alpha,\lambda_+,\lambda_-)=m_0 x+C(G(x;\alpha,\lambda_+)+G(-x;\alpha,\lambda_-)). \quad (15)$$

Since the RDTS distribution is infinitely divisible, a process can be generated. A process $X=(X_t)_{t \geq 0}$ is said to be a RDTS process with parameters $(\alpha,C_+,C_-,\lambda_+,\lambda_-,m)$ if $X_1 \sim \text{RDTS}(\alpha,C_+,C_-,\lambda_+,\lambda_-,m)$.

The parameter $\alpha$ determines the path behavior; that is, the RDTS process has finite variation if $\alpha<1$ and infinite variation if $\alpha>1$.

Theorem 2. (Series representation of the RDTS distribution) Consider $\alpha \in (0,2)\setminus\{1\}$, $C>0$, and $\lambda_+,\lambda_->0$. Let $\{v_j\}$ be an iid. sequence of random variables in $\{\lambda_+,\lambda_-\}$ with $P(v_j=\lambda_+)=P(v_j=-\lambda_-)=\frac{1}{2}$. Let $\{u_j\}$ be an iid. sequence of uniform random variables on $(0,1)$ and let $\{e_j\}$ and $\{e'_j\}$ be iid. sequences of exponential random variables with parameters 1 and $\frac{1}{2}$, respectively. Furthermore, assume that $\{v_j\}$, $\{u_j\}$, $\{e_j\}$ and {e'$_j$} are independent. Consider $\gamma_j = e'_1 + \ldots + e'_j$. Suppose that all the above assumption are fulfilled. If $\alpha \in (0,2)\setminus\{1\}$, the series $$X = \sum_{j=1}^{\infty} \left( \left( \frac{\alpha \gamma_j}{C} \right)^{-1/\alpha} \wedge \sqrt{2} \, e_j^{1/2} u_j^{1/\alpha} |v_j|^{-1} \right) \frac{v_j}{|v_j|} - \frac{C \Gamma\left( \frac{1-\alpha}{2} \right)}{2^{\frac{\alpha+1}{2}}} (\lambda_+^{\alpha-1} - \lambda_-^{\alpha-1})$$

converges a.s.. Furthermore, that $X \sim \text{RDTS}(\alpha, C, C, \lambda_+, \lambda_-, 0)$.

The following theorem is used for determining the EMM.

Proposition 1 Suppose $(X_t)_{t \in [0,T]}$ is the RDTS process with parameters $(\alpha, C_+, C_-, \lambda_+, \lambda_-, m)$ under P, and the RDTS process with parameters $(\tilde{\alpha}, \tilde{C}_+, \tilde{C}_-, \tilde{\lambda}_+, \tilde{\lambda}_-, \tilde{m})$ under Q. Then $P|_{F_t}$ and $Q|_{F_t}$ are equivalent for all $t>0$ if and only if $\alpha = \tilde{\alpha}$, $C_+ = \tilde{C}_+$, $C_- = \tilde{C}_-$, and $\tilde{m} = m$. When P and Q are equivalent, the Radon-Nikodym derivative is $$\frac{dQ}{dP} \bigg|_{F_t} = e^{U_t}$$

where $(U_t, P)$ is a process with triplet $(A_U^2, V_U, \gamma_U)$ given by $$A_U^2 = 0, \, \nu_U = \circ \psi^{-1}, \, \gamma_U = -\int_{-\infty}^{\infty} (e^y - 1 - y 1_{|y| \leq 1})(\circ \psi^{-1})(dy) \quad (16)$$

where $$\psi(x) = \frac{1}{2}(\tilde{\lambda}_+^2 - \tilde{\lambda}_+^2) x^2 1_{x>0} + \frac{1}{2}(\lambda_-^2 - \tilde{\lambda}_-^2)(-x)^2 1_{x<0}.$$

Applying Proposition 1 to RDTS distributed random variables, we can obtain the following corollary.

Corollary 1 (a) Let X:RDTS $(\alpha, C_+, C_-, \lambda_+, \lambda_-, m)$ under a measure P, and X:RDTS $(\tilde{\alpha}, \tilde{C}_+, \tilde{C}_-, \tilde{\lambda}_+, \tilde{\lambda}_-, \tilde{m})$ under a measure Q. Then P and Q are equivalent if and only if $\alpha = \tilde{\alpha}$, $C_+ = \tilde{C}_+$, $C_- = \tilde{C}_-$, and $\tilde{m} = m$.

(b) Let X:stdRDTS $(\alpha, \lambda_+, \lambda_-)$ under a measure P, and $(X+k)$:stdRDTS $(\tilde{\alpha}, \tilde{\lambda}_+, \tilde{\lambda}_-)$ under a measure Q for a constant $k \in \mathbb{R}$. Then P and Q are equivalent if and only if $$\alpha = \tilde{\alpha}, \quad (17)$$

$$\tilde{\lambda}_+^{\alpha-2} + \tilde{\lambda}_-^{\alpha-2} = \lambda_+^{\alpha-2} + \lambda_-^{\alpha-2},$$

$$k = \frac{\Gamma\left(\frac{1-\alpha}{2}\right)(\lambda_-^{\alpha-1} - \lambda_+^{\alpha-1} - \tilde{\lambda}_+^{\alpha-1} + \tilde{\lambda}_-^{\alpha-1})}{\sqrt{2} \Gamma\left(1 - \frac{\alpha}{2}\right)(\lambda_+^{\alpha-2} + \lambda_-^{\alpha-2})}.$$

ARMAX-GARCH Processes

To describe the time evolution of the risk factors, a general time series model offering enough flexibility to capture the above-mentioned statistical properties such as clustering of the volatility is needed. Therefore, consider the following model, which is used to describe every marginal of the vector of risk factors to be described:

$$Y_t = c_0 + \sum_{k=1}^{d} c_k X_t^{(k)} + \sum_{i=1}^{n} \alpha_i Y_{t-i} + f(\sigma_t) + \sum_{j=1}^{m} b_j \sigma_{t-j} \varepsilon_{i-j} + \sigma_t \varepsilon_i \quad (32)$$

where $Y_t$ denotes the dependent variable, $X_t = (X_t^{(1)}, X_t^{(2)}, \ldots, X_t^{(d)})$ a vector of exogenous variables. The process includes an autoregressive term of length n, a moving average term of length m. The measurable function f embodies a generalized ARCH-in mean term, which allows for a non-linear influence of the volatility/variance in the conditional mean equation. In the present embodiment, the innovation process $(\varepsilon_t)_{t \in}$ is assumed to independent and identically distributed (iid) with zero mean and unit variance. The time dependent volatility is modeled with the help of a GARCH (p,q) process:

$$\sigma_t^2 = \alpha_0 + \sum_{k=1}^{q} \alpha_k + \sigma_{t-k}^2 \varepsilon_{t-k}^2 + \sum_{k=1}^{p} \beta_k \sigma_{t-k}^2 \quad (33)$$

In this illustration, the classical GARCH process is used, but different GARCH specifications such as E-GARCH, TS-GARCH or I-GARCH could be used for some embodiments.

Some embodiments will extend the univariate formulation to a multivariate setting in different ways. The multivariate dependency can be constructed by a copula function. The marginal evolution of every risk factor is modeled according to equation (32) and (33), and the dependence structure is introduced by a copula function C which describes the joint distribution of the N-dimensional innovation vector $\epsilon_t$ as equation (11).

In other embodiments, the multivariate dependency will be generated by using a vector ARMAX-GARCH process of the following form (for simplicity only the the ARCH(1)-process in the bivariate case is shown, but those skilled in the art will understand the simple extension of this formulation to higher dimensional cases):

$$\begin{bmatrix} \sigma_{11,t} \\ \sigma_{21,t} \\ \sigma_{22,t} \end{bmatrix} = \begin{bmatrix} \omega_{11,t} \\ \omega_{21,t} \\ \omega_{22,t} \end{bmatrix} + \begin{bmatrix} \alpha_{11} & \alpha_{12} & \alpha_{13} \\ \alpha_{21} & \alpha_{22} & \alpha_{23} \\ \alpha_{31} & \alpha_{32} & \alpha_{33} \end{bmatrix} \begin{bmatrix} \varepsilon_{1,t-1}^2 \\ \varepsilon_{1,t-1} \varepsilon_{2,t-1} \\ \varepsilon_{2,t-1}^2 \end{bmatrix} \quad (34)$$

Yet, other embodiments will incorporate dynamic conditional correlation as proposed by Engle, R. F. (2000), "Dynamic conditional correlation—a simple class of multivariate GARCH models", *Economics Working Paper Series from Department of Economies, UC San Diego,* (2000) to model the multivariate dependency, the disclosure of which is incorporated by reference.

Some embodiments allow the choice of one or more multivariate dependency structures. Other embodiments include facilities to test various possible dependency structures on historical data to determine the structure best suited for the data set. These test facilities may be fully automatic, or fully or partly under the control of a user or operator.

For the embodiments discussed above, the marginal distribution of the innovation process is described by infinitely divisible distributions with zero mean and unit variance. Some embodiments will have the standard RDTS distributed innovation, and some other embodiments will have another subclass of the SynTS distributed innovation. Additionally, the foregoing discussion applies equally to other time series processes, such as the ARMA-GARCH and ARIMA-IG-ARCH families.

Implementation: Parameter Estimation

The set of unknown parameters for each risk factor used in some embodiments consists of:
- d+1 parameters for the constant term and the exogenous variables;
- n autoregressive terms;
- m moving average terms, and;
- p+q+1 GARCH parameters.

These parameters form the set of model parameters that must be estimated. The set of distribution parameters depends on the chosen distribution. For example, within embodiments using standard RDTS or standard ERDTS distributed innovations, there are three distribution parameters per model dimension, and embodiments using standard GRDTS distributed innovations, there are four distribution parameters per model dimension.

In some embodiments, these parameters are simultaneously estimated by means of a numerical conditional maximum likelihood procedure (MLE).

In other embodiments, these parameters are estimated stepwise by a Gaussian conditional maximum-likelihood procedure for the model parameters and, in a second step, the distribution parameters are determined from the empirical residuals.

Some other embodiments make use of an iterative estimation procedure, where the model and distribution parameter estimation is iterated until some exit criterion is reached.

In some embodiments, the d-exogenous risk factors and their factor loadings in (32) can be determined (estimated) using factor analysis (time-series factor analysis, cross-sectional factor analysis, or statistical factor analysis) that the use of such factor models can lead to significant reduction of the number d of risk factors involved in the estimation of the model parameters.

In some embodiments the ARMAX-GARCH processes can be used as models in factor analysis, where the d-exogenous variables explain the systematic risk component while the autoregressive part in (32) together with (33) describes the idiosyncratic (non-systematic) risk. Such an approach is an extension of a time series factor analysis framework.

Implementation: Calculating VaR and AVaR

Let $f_x$, $\phi_x$, and $F_x$ be the density function, the characteristic function, and the cumulative distribution function of a tempered stable random variable X, respectively.

The characteristic function of a given random variable X is defined by the Fourier transform of the probability density function; that is, $$\phi_X(u) = E[e^{iux}] = \int_{-\infty}^{\infty} e^{iux} f_X(x) dx.$$

Therefore, we can obtain the probability density function by the inverse Fourier transform:

$$f_X(x) = \frac{1}{2\pi} \int_{-\infty}^{\infty} e^{-uix} \phi_X(u) du.$$

By the property $\phi_x(-u) = \overline{\phi_x(u)}$, we have $$f_X(x) = \frac{1}{\pi} \Re \left( \int_0^{\infty} e^{-uix} \phi_X(u) du \right), \quad (1)$$

where $\Re(z)$ means taking only the real part of the complex number z. The numerical method for calculating the integral in equation (1) with the FFT method. To obtain the cumulative distribution function of tempered stable distributions, we need the following proposition:

Proposition 2 Suppose a random variable X is infinitely divisible. If there is a $\rho > 0$ such that $|\phi_x(u+i\rho)| < \infty$ for all $u \in R$, then the cumulative distribution function $F_x$ of X is given by $$F_X(x) = \frac{e^{x\rho}}{\pi} \Re \left( \int_0^{\infty} e^{-ixu} \frac{\phi_X(u+i\rho)}{\rho - ui} du \right), \quad \text{for } x \in R. \quad (2)$$

Proposition 2 can be applied to the tempered stable distribution as follows:

The VaR of X at tail probability $\epsilon$ is defined as $$VaR_\epsilon(X) = -\inf\{y \in R : P(X \leq y) \leq \epsilon\}$$

If $F_x(x)$ is continuous, then we have $VaR_\epsilon(X) = -F_x^{-1}(\epsilon)$. The definition of AVaR with the significance level $\eta$ is $$AVaR_\eta(X) = \frac{1}{\eta} \int_0^{\eta} VaR_\epsilon(X) d\epsilon.$$

AVaR of the temperes stable distributions can be obtained by the following proposition.

Proposition 3 Let Y be a random variable for the return of an asset or portfolio. Suppose Y is infinitely divisible and the distribution function of Y is continuous. If there is $\rho > 0$ such that $|\phi_Y(-u+i\rho)| < \infty$ for all $u \in$, then $$AVaR_\eta(Y) = VaR_\eta(Y) - \frac{e^{-VaR_\eta(Y)\rho}}{\pi\eta} \Re \left( \int_0^{\infty} e^{-iuVaR_\eta(Y)} \frac{\phi_Y(-u+i\rho)}{(-u+i\rho)^2} du \right). \quad (1)$$

Consider the ARMA-GARCH model. Since for every t>0 the distribution of $y_t$ is continuous, we define the conditional AVaR and VaR of $y_{t+1}$ for the information until time t with the significance level $\eta$ by the following form:

$$AVaR_{t,\eta}(y_{t+1}) = -(c + ay_t + b\sigma_t \epsilon_t) + \sigma_{t+1,t,\eta} AVaR(\epsilon_{t+1})$$

and $$Var_{t,\eta}(y_{t+1}) = -(c + ay_t + b\sigma_t \epsilon_t) + \sigma_{t+1,t,\eta} VaR(\epsilon_{t+1}).$$

Implementation: Pricing Derivatives

Model prices for the financial derivatives are evaluated by the Monte Carlo simulation. Let $(S_t)_{t \in [0,T]}$ be the risk-neutral process for price vector of underlyings related to the given derivative. Suppose that the parameters for generating the sample path of $(S_t)_{t \in [0,T]}$ are estimated by the methods in Section Infinitely divisible distribution._Some embodiments generate the risk-neutral price process of $(S_t)_{t \in [0,T]}$ by applying Theorem 1, while other embodiments generate the risk-neutral price process by applying Proposition 1, or corollary 1. When using Monte-Carlo simulation, discretize the process that $(S_t)_{t \in I_n}$ where $I_n = \{t_i : i \in_0, 0 = t_0 < t_1 < \ldots < t_n = T\}$.

The random number generating methods and variance reduction techniques can be founded in the extensive literature that addresses Monte-Carlo simulation. For example, standard references can include Glasserman, P. (2003), *Monte Carlo Method In Financial Engineering*, Springer.

For European style derivatives, the arbitrage-free price of an option on time t<T with payoff $f((S_t)_{t \in [0,T]})$ and maturity T is given by $$\exp\left(-\int_t^T r_s ds\right) E[f((S_t)_{t \in [0,T]}) \mid F_t]. \quad (35)$$

The embodiments will use discretized equation for (35):

$$C_t = \exp\left(-\sum_{j=t+1}^T r_j\right) E[f(S_{t_0}, S_{t_1}, \ldots, S_{t_n}) \mid F_t], \quad (36)$$

for Monte-Carlo simulation.

For pricing American style derivatives with Monte-Carlo simulation, the embodiments will use the Least Square Regression method with volatility parameter (LSMv). The Least Square Regression Method (LSM) was introduced by Longstaff, F. A., and Schwartz, E. S., "Valuing American options by simulation: a simple least-squares approach," *Review of Financial Studies*, 14: 113-147 (2001), the disclosure of which is incorporated by reference. However, Longstaff and Schwartz's LSM is constructed under the markov process, and it does not consider the volatility parameter. The LSMv considers stock price process and volatility process together in the regression.

Example: Pricing Call Options Under the GARCH Model with RDTS Distributed Innovations In this section, the method used standard RDTS as the distribution of the innovation $\epsilon_t$. Moreover, some embodiments will apply other subclasses of infinitely divisible distributions to the innovation distribution, and the extensions to these cases should be clearly understood by those skilled in the art. Some embodiments will have the capabilities to price derivative products with other types of underlying or using the multivariate dependency methodologies discussed previously; the extensions to these cases should again also be clearly understood by those skilled in the art.

The stock price model is defined over a filtered probability space $(\Omega, F, (F_t)_{t \in R}, P)$ which is constructed as follows: Consider a sequence $(\epsilon_t)_{t \in}$ of iid real random variables on a sequence of probability spaces $(\Omega_t, P_t)_{t \in N}$, such that $\epsilon_t$ is the standard RDTS distributed random variable on $(\Omega_t, P_t)$. Now we define $\Omega := \Pi_{t \in N} \Omega_t$, $F_t := \bigotimes_{k=1}^t \sigma(\epsilon_k) \bigotimes F_0 \bigotimes F_0 \ldots$, $F := \sigma(\bigcup_{t \in N} F_t)$, and $P := \bigotimes_{t \in N} P_t$, where $F_0 = \{\emptyset, \Omega\}$ and $\sigma(\epsilon_k)$ means the $\sigma$-algebra generated by $\epsilon_k$ on $\Omega_k$.

We first propose the following stock price dynamics:

$$\log\left(\frac{S_t}{S_{t-1}}\right) = r_t - d_t + \lambda_t \sigma_t - L(\sigma_t) + \sigma_t \epsilon_t, \, t \in N, \quad (37)$$

where $S_t$ is the stock price at time t, $r_t$ and $d_t$ denote the risk-free and dividend rate for the period [t−1,t], respectively, and $\lambda_t$ is defined at the time t−1 and can be interpreted as the market price of risk. $S_0$ is the present observed price. The function L(x) is the log-Laplace-transform of $\epsilon_t$, i.e, $L(x) = \log(E[e^{x\epsilon_t}])$. The one period ahead conditional variance $\sigma_t^2$ follows a GARCH(1,1) process, i.e, $$\sigma_t^2 = (\alpha_0 + \alpha_1 \sigma_{t-1}^2 \epsilon_{t-1}^2 + \beta_1 \sigma_{t-1}^2), \, t \in N, \, \epsilon_0 = 0, \quad (38)$$

where $\alpha_0$, $\alpha_1$ and $\beta_1$ are non-negative, $\alpha_1 + \beta_1 < 1$, and $\alpha_0 > 0$. Clearly the process $(\sigma_t)_{t \in}$ is predictable.

By Corollary 1 (b), the following proposition is proven.

Proposition 4 Consider the RDTS-GARCH model. Let T ∈ N be a time horizon, fix natural number t≦T. Suppose $\tilde{\lambda}_+(t)$ and $\tilde{\lambda}_-(t)$ satisfy the following conditions:

$$\begin{cases} \tilde{\lambda}_+(t)^{\alpha-2} + \tilde{\lambda}_-(t)^{\alpha-2} = \lambda_+^{\alpha-2} + \lambda_-^{\alpha-2} \\ \dfrac{\Gamma\left(\dfrac{1-\alpha}{2}\right)(\lambda_+^{\alpha-1} - \lambda_-^{\alpha-1} - \tilde{\lambda}_+^{\alpha-1}(t) + \tilde{\lambda}_-^{\alpha-1}(t))}{\sqrt{2}\,\Gamma\left(1 - \dfrac{\alpha}{2}\right)(\lambda_+^{\alpha-2} + \lambda_-^{\alpha-2})} = \\ \lambda_t + \dfrac{1}{\sigma_t}(L_{RDTS}(\sigma_t; \alpha, \tilde{\lambda}_+(t), \tilde{\lambda}_-(t)) - L_{RDTS}(\sigma_t; \alpha, \lambda_+, \lambda_-)) \end{cases} \quad (39)$$

Then there is a measure $Q_t$ equivalent to $P_t$ such that $\epsilon_t + k_t$: stdRDTS$(\alpha, \tilde{\lambda}_+(t), \tilde{\lambda}_-(t))$ on the measure $Q_t$ where $F_{t-1}$ measurable random variable $$k_t = \lambda_t + \frac{1}{\sigma_t}(L_{RDTS}(\sigma_t; \alpha, \tilde{\lambda}_+(t), \tilde{\lambda}_-(t)) - L_{RDTS}(\sigma_t; \alpha, \lambda_+, \lambda_-)). \quad (40)$$

Suppose $\tilde{\lambda}_+(t)$ and $\tilde{\lambda}_-(t)$ satisfy the condition (39) in each time t ∈ N. The stock price dynamic is given.

$$\log\left(\frac{S_t}{S_{t-1}}\right) = r_t - d_t + \lambda_t \sigma_t - L_{RDTS}(\sigma_t; \alpha, \lambda_+, \lambda_-) + \sigma_t \epsilon_t =$$

$$r_t - d_t - L_{RDTS}(\sigma_t; \alpha, \tilde{\lambda}_+(t), \tilde{\lambda}_-(t)) + \sigma_t(\epsilon_t + k_t)$$

where $k_t$ is equal to equation (40). By Proposition 4, there is a measure $Q_t$ equivalent to $P_t$ such that $\epsilon_t + k_t$:stdRDIS$(\alpha, \tilde{\lambda}_+(t), \tilde{\lambda}_-(t))$ on the measure $Q_t$, and hence $$\log\left(\frac{S_t}{S_{t-1}}\right) = r_t - d_t - L_{RDTS}(\sigma_t; \alpha, \tilde{\lambda}_+(t), \tilde{\lambda}_-(t)) + \sigma_t \xi_t$$

where $\xi_t$:stdRDTS$(\alpha, \tilde{\lambda}_+(t), \tilde{\lambda}_-(t))$. Since $\lambda_t \sigma_t$ disappears in the dynamic on $Q_t$, the variable $\lambda_t$ can be interpreted as the market price of risk. Consequently, deduce a risk-neutral stock price dynamic from Proposition 4 as follows:

$$\begin{cases} \log\left(\dfrac{S_t}{S_{t-1}}\right) = r_t - d_t - L_{RDTS}(\sigma_t; \alpha, \tilde{\lambda}_+(t), \tilde{\lambda}_-(t)) + \sigma_t \xi_t \\ \xi_t : stdRDTS(\alpha, \tilde{\lambda}_+(t), \tilde{\lambda}_-(t)) \end{cases} \quad (41)$$

t ∈ N having the following variance process $$\sigma_t^2 = (\alpha_0 + \alpha_1 \sigma_{t-1}^2 (\xi_{t-1} - k_{t-1})^2 + \beta_1 \sigma_{t-1}^2). \quad (42)$$

The risk-neutral stock price dynamic is called the the RDTS-GARCH option pricing model. Under the RDTS- GARCH option pricing model, the stock price $S_t$ at time $t>0$ is given by $$S_t = S_0 \exp\left(\sum_{j=1}^{t} \left(r_j - d_j - L_{RDTS}(\sigma_j; \alpha, \tilde{\lambda}_+(j), \tilde{\lambda}_-(j)) + \sigma_j \xi_j\right)\right).$$

Consider the RDTS-GARCH model with the assumption that the GARCH parameters ($\alpha_0$, $\alpha_1$, and $\beta_1$), the standard RDTS parameters ($\alpha$, $\lambda_+$, and $\lambda_-$), the constant market price of risk $\lambda_t = \lambda$, and the conditional variance $\sigma_{t_0}^2$ of the initial time $t_0$ are estimated from the historical data. Then the risk-neutral process for the RDTS-GARCH option pricing model is generated by the following algorithm.

Algorithm:
1. Initialize $t:=t_0$.
2. Find the parameters $\tilde{\lambda}_+(t)$ and $\tilde{\lambda}_-(t)$ satisfying condition (39).
3. Generate random number $\xi_t$:stdRDTS($\alpha,\tilde{\lambda}_+(t),\tilde{\lambda}_-(t)$).
4. Let $$\log\left(\frac{S_t}{S_{t-1}}\right)$$

be equal to equation (41).
5. Let $k_t$ be equal to equation (40).
6. Set $t=t+1$ and then substitute $\sigma_t^2=(\alpha_0+\alpha_1\sigma_{t-1}^2(\xi_{t-1}-k_{t-1})^2+\beta_1\sigma_{t-1}^2)$.
7. Repeat 2:6 until $t>T$.

The arbitrage free price $C_t$ of a call option on time $t<T$ with strike K and maturity T is given by $$C_t = \exp\left(-\sum_{j=t+1}^{T} r_j\right) E[(S_T - K)^+ \mid F_t]. \quad (43)$$

Since there is not an efficient analytical form for the option price (43) for the RDTS-GARCH option pricing models, the call option prices are determined by the Monte Carlo method.

Figure 6:
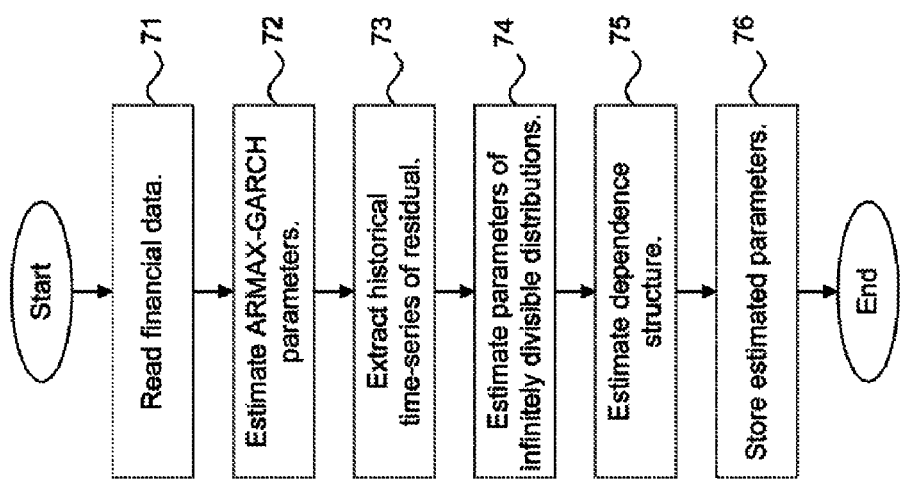
FIG. 6 is a flow diagram showing a method for market parameter estimation, in accordance with one embodiment.

FIG. 6 is a flow diagram 70 showing a method for market parameter estimation, in accordance with one embodiment.

Financial data, such as returns of individual securities, market indexes (i.e. returns of appropriate market indices, various types of yield curves, exchange rates, interest rates, and default probability), and derivatives prices including options and futures are retrieved from a financial database 15-17 (block 71). ARMAX-GARCH model parameters are then estimated using the maximum likelihood estimation under the assumption of normally distributed residual or Student-t distributed residual (block 72). The ARMAX-GARCH parameter estimator 41 estimates ARMAX-GARCH model parameters using returns of individual securities and market indexes, and then generate a residual time-series 43. The ARMAX-GARCH model is described above in the section titled ARMAX-GARCH process.

The historical time-series of the residual is extracted using the financial data and estimated parameters (block 73). The maximum likelihood estimation is applied again to estimate parameters of infinitely divisible distributions using the extracted historical time-series residual (block 74). Parameters of infinitely divisible distributions are modeled by various tempered stable and tempered infinitely divisible distributions, as described above in the section titled Infinitely Divisible Distribution. The dependence structure is estimated using the extracted residuals or read financial data (block 75). The dependence structure can be modeled in two ways, by a copula method, such as a skewed t-copula, or by a sub-Gaussian model as described above in the section titled Multi-dimensional Consideration. Estimated parameters are then stored in the parameter database 35 (block 76).

Figure 7:
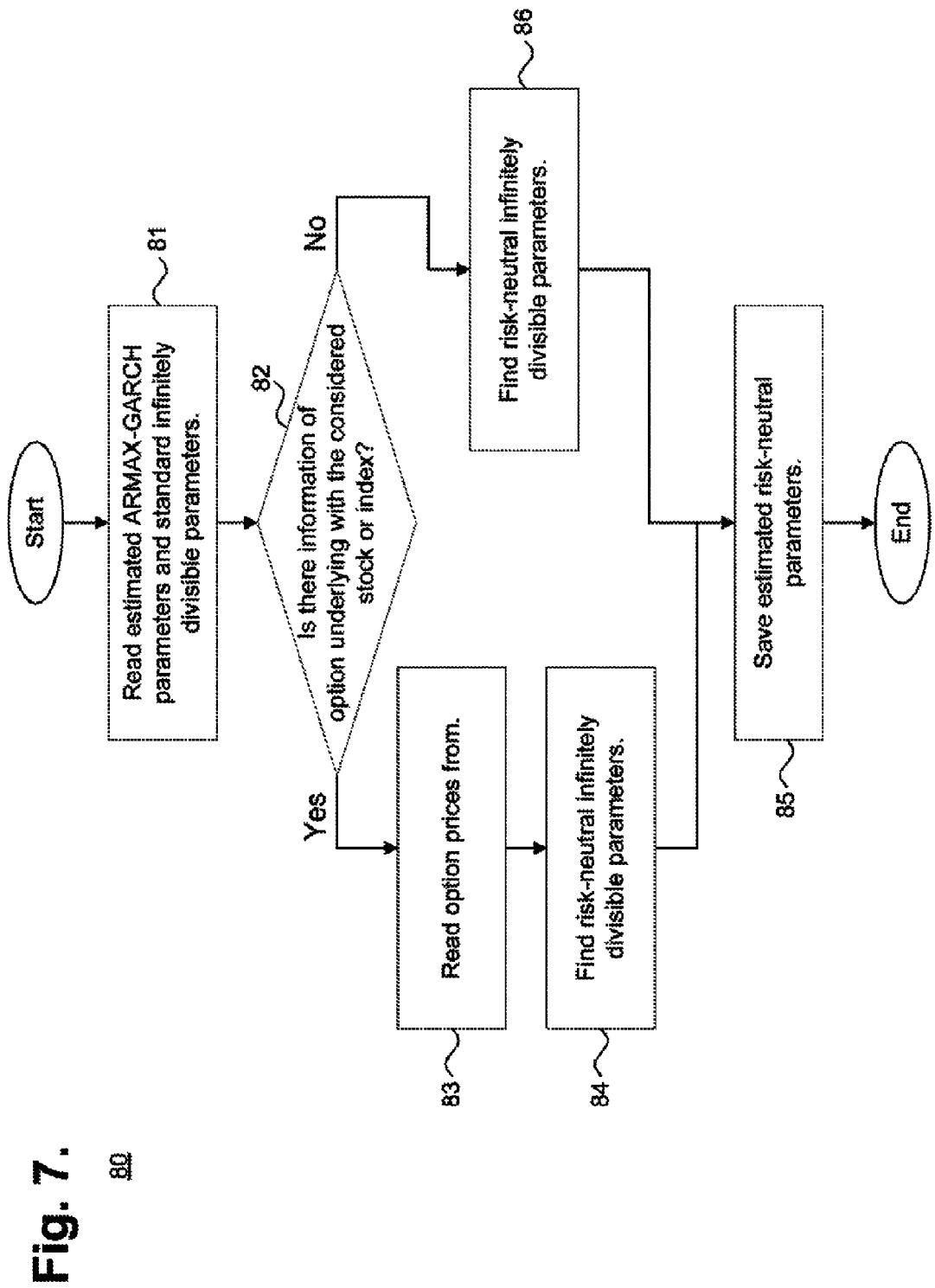
FIG. 7 is a flow diagram showing a method for risk-neutral parameter estimation, in accordance with one embodiment.

FIG. 7 is a flow diagram 80 showing a method for risk-neutral parameter estimation, in accordance with one embodiment. Derivatives prices and market parameters estimated in the market parameter estimation portion, as described above with reference to FIG. 6, are retrieved. Next, the determination is made whether information of options underlying with the considered financial data, such as stock or index, is available (block 82).

Risk-neutral parameters of an infinitely divisible model are estimated from the retrieved derivatives prices and estimated. The risk neutral parameters deduce an equivalent martingale measure (EMM), which is a martingale measure equivalent to the market measure generated by the market infinitely divisible parameters. If market data of derivative prices for a given underlying stock is given (block 83), risk neutral parameters can be estimated using the derivative prices (block 84). First, fix ARMAX-GARCH parameters estimated using market stock prices. Next, calibrate risk neutral parameters which minimize the distance between theoretical derivative prices and market prices. For example, the square root error can be used as the distance. The theoretical price can be calculated by the Monte-Carlo simulation method.

If there is no derivative price data, then the find risk neutral parameter is used such that the measure generated by the risk-neutral measure becomes an EMM, satisfying conditions of Theorem 1, Proposition 1, or Corollary 1, as described above (block 85). In either case, the estimated risk-neutral parameters are then stored (block 86).

Figure 8:
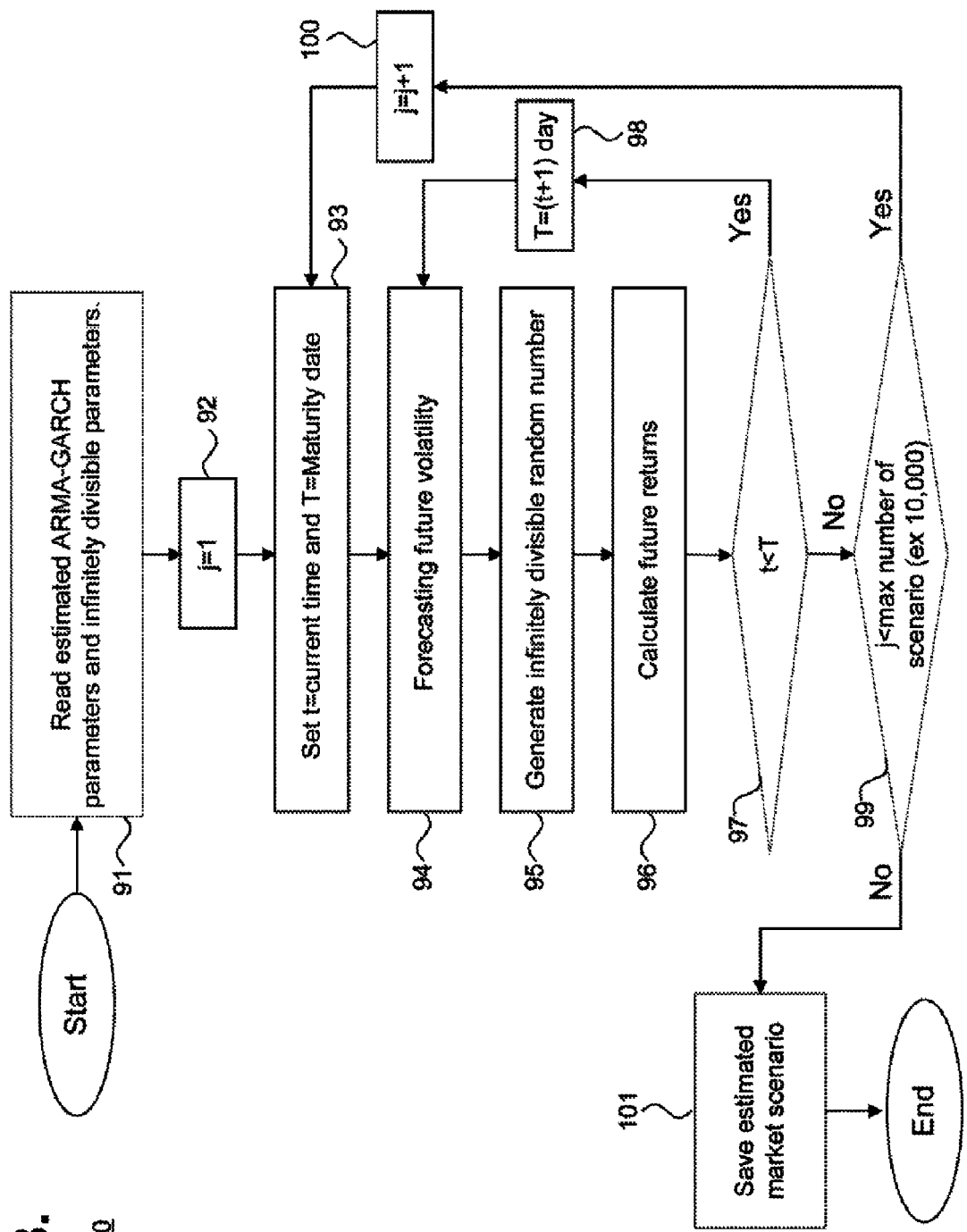
FIG. 8 is a flow diagram showing a method for generating market scenarios, in accordance with one embodiment.

FIG. 8 is a flow diagram 90 showing a method for generating market scenarios, in accordance with one embodiment. ARMA-GARCH model parameters and infinitely divisible model parameters are retrieved from the parameter database 35 (block 91). Next, scenario, j, is set to 1 (block 92) and time, t, is set to the current time and T is a parameter of the algorithm which is set equal to the maturity date (block 93). Future volatility is forecast using the GARCH model (block 94).

An infinitely divisible random number is generated using the infinitely divisible parameter retrieved (block 95). The infinitely divisible models are described above in the section titled Infinitely Divisible Distribution. The infinitely divisible random number can be generated by an inverse transform algorithm or series representation method. The inverse transform algorithm uses inverse function of cumulative distribution function to generate the random numbers. Inverse function of the cumulative distribution function for given infinitely divisible distribution is taken. Next, uniformly distributed random numbers are put into the inverse function and then the random number for a given infinitely divisible distribution is obtained. The cumulative distribution function for infinitely divisible distribution is described further below in relation to Proposition 2. Series representation for the RDTS distribution can be simulated by Theorem 2.

The future returns are calculated using the ARMAX model with the generated random numbers (block 96). The future return is put into the j-th scenario at time t. The ARMAX-GARCH model is described above in the section titled ARMAX-GARCH process. The determination is then made whether t<T (block 97). If so, then T is set to (t+1) day (block 98) and the method returns to the forecasting future volatility step (block 94). If t is not less than T, then the determination is made whether scenario j is less than the maximum number of scenarios, for example, 110,000 scenarios (block 99). If j is less than the maximum number of scenario, then j is set to j+1 (block 100) and the method returns to block 93. If j is not less than the maximum number of scenario, then the market scenarion generated is stored (block 101).

Figure 9:
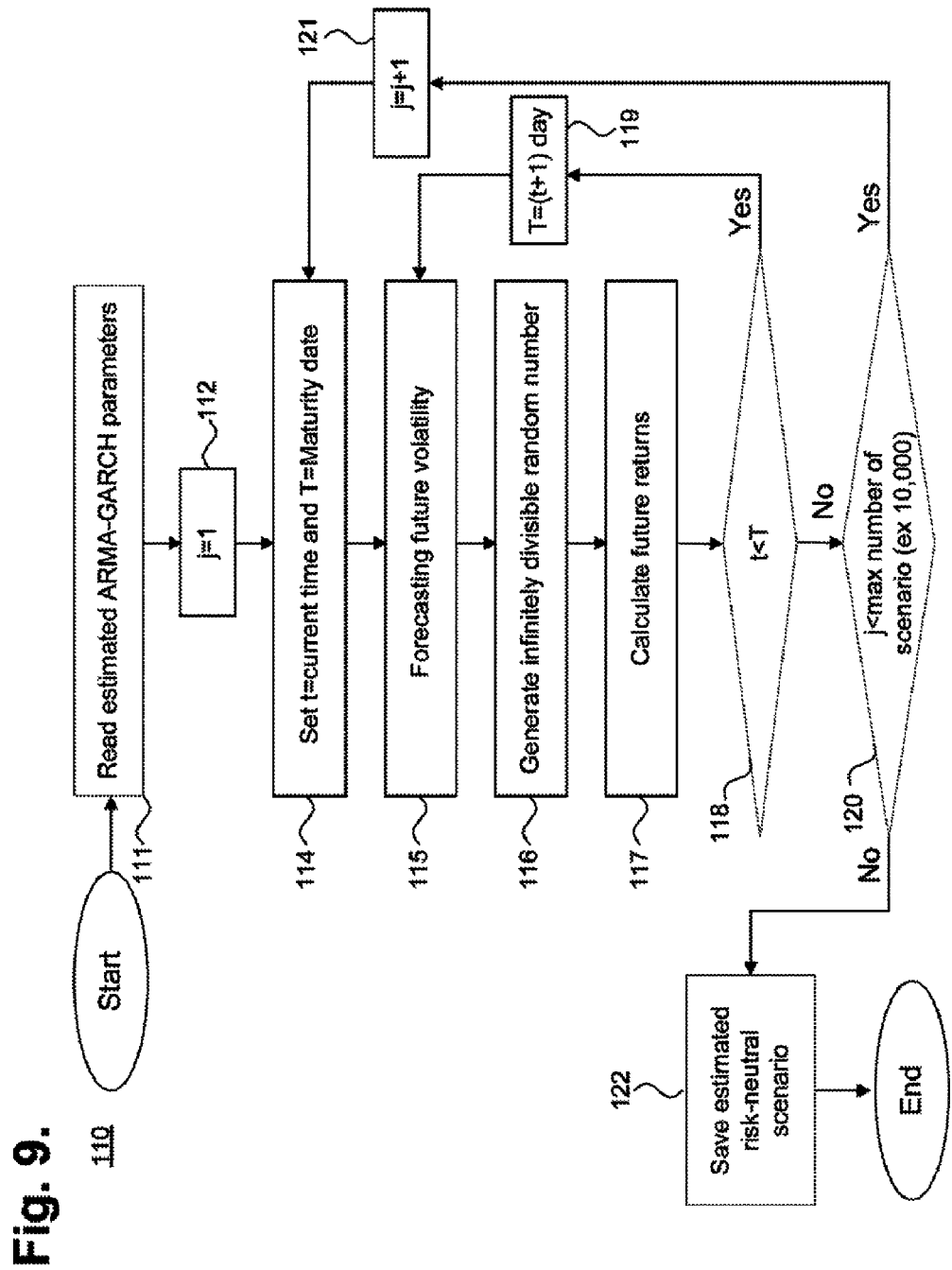
FIG. 9 is a flow diagram showing a method for generating risk-neutral scenarios, in accordance with one embodiment.

FIG. 9 is a flow diagram 110 showing a method for generating risk-neutral scenarios, in accordance with one embodiment. ARMA-GARCH model parameters are retrieved from the parameter database 35 (block 111). Next, scenario, j, is set to 1 (block 112) and time, t, is set to the current time and T is a parameter of the algorithm which is set equal to the maturity date (block 113). Future volatility is forecast using the GARCH model (block 114). Risk-neutral infinitely divisible parameters which generate equivalent martingale measures are found. The find risk-neutral parameter are found such that the measures generated by the risk-neutral measure are equivalent martingale measures, and satisfy conditions of Theorem 1, Proposition 1, or Corollary 1, as described above (block 115).

An infinitely divisible random number is generated using the risk-neutral infinitely divisible parameter found (block 116). The infinitely divisible models are described above in the section titled Infinitely Divisible Distribution B. The infinitely divisible random number can be generated by an inverse transform algorithm or series representation method. The inverse transform algorithm uses inverse function of cumulative distribution function to generate the random numbers. Inverse function of the cumulative distribution function for given infinitely divisible distribution is taken. Next, uniformly distributed random numbers are put into the inverse function and then the random number for a given infinitely divisible distribution is obtained. The cumulative distribution function for infinitely divisible distribution is described further below in relation to Proposition 2. Series representation for the RDTS distribution can be simulated by Theorem 2.

The future returns are calculated using the ARMAX model with the generated random numbers (block 117). The future return is put into the j-th scenario at time t. The ARMAX-GARCH model is described above in the section titled ARMAX-GARCH process. The determination is then made whether t<T (block 118). If so, then T is set to (t+1) day (block 119) and the method returns to the forecasting future volatility step (block 114). If t is not less than T, then the determination is made whether scenario j is less than the maximum number of scenarios, for example, 110,000 scenarios (block 120). If j is less than the maximum number of scenario, then j is set to j+1 (block 121) and the method returns to block 113. If j is not less than the maximum number of scenario, then the market scenario generated is stored (block 122).

While the invention has been particularly shown and described as referenced to the embodiments thereof, those skilled in the art will understand that the foregoing and other changes in form and detail may be made therein without departing from the spirit and scope.

What is claimed is:

1. A computer-implemented system for estimating portfolio risk using an infinitely divisible distribution, comprising:
   a memory containing a database configured to store a time series comprising a plurality of risk factors applicable over at least one time horizon, a portfolio comprising a plurality of financial assets, and one or more risk adjusted return points for the financial assets;
   an input device to receive input from a user;
   a network operatively coupled and providing communication between the memory, the input device, an output device, and a processor; where the processor is programmed to execute program modules, the program modules comprising:
   an association module configured to associate the financial assets with the risk factors;
   a parameter estimation module configured to estimate the parameters of one or more risk factors through an infinitely divisible tempered stable distribution model exhibiting leptokurtic behavior having the measure v(dx) defined in polar coordinate according to $$v(dx)=M(dr,du)=r^{-\alpha-1}q(r,u)dr\,\zeta(du),$$

where q(r,u) is a positive function on $(0,\infty) \times S^{d-1}$ such that $\lim_{r \to 0}+q(r,u)>0$ and $\lim_{r \to \infty}q(r,u)=0$ and where $q(r,1)=e^{-\lambda_+^2 r^2/2}$, $q(r,-1)=e^{-\lambda_-^2 r^2/2}$, and
   $\zeta(1)=C_+$, $\zeta(-1)=C_-$, wherein $C_+, C_-, \lambda_+, \lambda_->0$;
   a scenario generation module to generate scenarios for the model;
   an application module to determine at least one of value at risk, average value at risk, option price, and portfolio optimization from the estimated parameters and the generated scenarios; and
   an application module to determine output comprising at least one of value at risk, average value at risk, option price, and portfolio optimization from the estimated parameters and the generated scenarios;
   an output device configured to provide the output generated in the application module to the user.

2. A system according to claim 1 wherein the parameters are at least one of market parameters and risk-neutral parameters.

3. A system according to claim 1, further comprising;
   a ARMAX-GARCH parameter module to estimate ARMAX-GARCH parameters from the return points and to generate a residual time-series; and
   a dependency estimator module to estimate infinitely divisible model parameters using the ARMAX-GARCH parameters and the residual time-series.

4. A system according to claim 3, further comprising;
   a risk-neutral parameter estimator module to estimate risk-neutral parameters from the ARMAX-GARCH parameters and the infinitely divisible model parameters.

5. A system according to claim 1, wherein the scenarios are at least one of market scenarios and risk-neutral scenarios.

6. A computer-implemented method for estimating portfolio risk using an infinitely divisible distribution, comprising steps of:
   storing a time series comprising a plurality of risk factors applicable over at least one time horizon, a portfolio comprising a plurality of financial assets, and one or more risk adjusted return points for the financial assets;
   associating the financial assets with the risk factors;
   estimating the parameters of one or more risk factors through an infinitely divisible tempered stable distribution model exhibiting leptokurtic behavior having the measure v(dx) defined in polar coordinate according to $$v(dx)=M(dr,du)=r^{-\alpha-1}q(r,u)dr\,\zeta(du),$$

where q(r,u) is a positive function on $(0,\infty) \times S^{d-1}$ such that $\lim_{r \to 0}+q(r,u)>0$ and $\lim_{r \to \infty}q(r,u)=0$ and where $q(r,1)=e^{-\lambda_+^2 r^2/2}$, $q(r,-1)=e^{-\lambda_-^2 r^2/2}$, and $\zeta(1)=C_+$, $\zeta(-1)=C_-$, wherein $C_+, C_-, \lambda_+, \lambda_->0$;
   generating scenarios for the model;
   determining at least one of value at risk, average value at risk, option price, and portfolio optimization from the estimated parameters and the generated scenarios; and providing the output generated in the application module to a user,
wherein the steps are performed by a processor.

7. A method according to claim 6 wherein the parameters are at least one of market parameters and risk-neutral parameters.

8. A method according to claim 6, further comprising;
estimating ARMAX-GARCH parameters from the return points;
generating a residual time-series; and
estimating infinitely divisible model parameters using the ARMAX-GARCH parameters and the residual time-series.

9. A method according to claim 8, further comprising;
estimating risk-neutral parameters from the ARMAX-GARCH parameters and the infinitely divisible model parameters.

10. A method according to claim 9 wherein the scenarios are at least one of market scenarios and risk-neutral scenarios.

11. A computer-implemented system for estimating portfolio risk using a multivariate model, comprising:
a memory containing a database configured to store a time series comprising a plurality of risk factors applicable over at least one time horizon, a portfolio comprising a plurality of financial assets, and one or more risk adjusted return points for the financial assets;
an input device to receive input from a user;
a network operatively coupled and providing communication between the memory, the input device, an output device, and a processor; where the processor is programmed to execute program modules, the program modules comprising:
an association module configured to associate the financial assets with the risk factors;
a parameter estimation module configured to estimate parameters of one or more risk factors through an infinitely divisible tempered stable distribution model exhibiting leptokurtic behavior according to $$X=(X_1, X_2, \ldots, X_N)=\mu+\gamma(T-1)+\sqrt{T}Z,$$

where $\mu=(\mu_1,\mu_2,\ldots,\mu_N) \in R^N$, $\gamma=(\gamma_1,\gamma_2,\ldots,\gamma_N) \in R^N$, $Z=(Z_1,Z_2,\ldots,Z_N) \sim N(0,\Sigma)$, $\Sigma=[\sigma_{k,l}]_{k,l\in\{1,2,\ldots,N\}}$, and $T$=1-dim GRDTS subordinator with parameters $(\alpha,C,\theta,p)$;
a scenario generation module to generate scenarios for the model;
an application module to determine output comprising at least one of value at risk, average value at risk, option price, and portfolio optimization from the estimated parameters and the generated scenarios; and
an output device configured to provide the output generated in the application module to the user.

12. A system according to claim 11, wherein the risk factors are selected from the group comprising market price returns, derived values and exogenous factors.

13. A system according to claim 11, wherein a plurality of time horizons are specified.

14. A system according to claim 11, wherein the portfolio is structured into a hierarchy of subportfolios.

15. A system according to claim 11, wherein estimates of returns are adjusted for returns of a risk free asset or a benchmark portfolio.

16. A computer-implemented method for estimating portfolio risk using a multivariate model, comprising steps of:
storing a time series comprising a plurality of risk factors applicable over at least one time horizon, a portfolio comprising a plurality of financial assets, and one or more risk adjusted return points for the financial assets;
associating the financial assets with the risk factors;
estimating parameters of one or more risk factors through an infinitely divisible tempered stable distribution model exhibiting leptokurtic behavior according to $$X=(X_1, X_2, \ldots, X_N)=\mu+\gamma(T-1)+\sqrt{T}Z,$$

where $\mu=(\mu_1, \mu_2, \ldots, \mu_N) \in R^N$, $\gamma=(\gamma_1, \gamma_2, \ldots, \gamma_N) \in R^N$, $Z=(Z_1, Z_2, \ldots, Z_N) \sim N(0,\Sigma)$, $\Sigma=[\sigma_{k,l}]_{k,l\in\{1,2,\ldots,N\}}$, and $T$=1-dim GRDTS subordinator with parameters $(\alpha,C,\theta,p)$;
generating scenarios for the model;
determining at least one of value at risk, average value at risk, option price, and portfolio optimization from the estimated parameters and the generated scenarios; and
providing the output generated in the application module to a user,
wherein the steps are performed by a processor.

17. A method according to claim 16, wherein the risk factors are selected from the group comprising market price returns, derived values and exogenous factors.

18. A method according to claim 16, wherein a plurality of time horizons are specified.

19. A method according to claim 16, wherein the portfolio is structured into a hierarchy of subportfolios.

20. A method according to claim 16, wherein estimates of returns are adjusted for returns of a risk free asset or a benchmark portfolio.

* * * * *